United States Patent
Dutta

(10) Patent No.: US 12,126,548 B2
(45) Date of Patent: Oct. 22, 2024

(54) SUPPORTING COMMUNICATIONS FOR DATA STORAGE

(71) Applicant: Nokia Solutions and Networks Oy, Espoo (FI)

(72) Inventor: Pranjal Kumar Dutta, Sunnyvale, CA (US)

(73) Assignee: Nokia Solutions and Networks Oy, Espoo (FI)

( * ) Notice: Subject to any disclaimer, the term of this patent is extended or adjusted under 35 U.S.C. 154(b) by 559 days.

(21) Appl. No.: 17/212,478

(22) Filed: Mar. 25, 2021

(65) Prior Publication Data

US 2022/0311716 A1   Sep. 29, 2022

(51) Int. Cl.
*H04L 49/90* (2022.01)
*H04L 45/24* (2022.01)
*H04L 69/22* (2022.01)

(52) U.S. Cl.
CPC .............. *H04L 49/90* (2013.01); *H04L 45/24* (2013.01); *H04L 69/22* (2013.01)

(58) Field of Classification Search
CPC ..... H04L 45/24; H04L 49/90; H04L 67/1097; H04L 69/22
See application file for complete search history.

(56) References Cited

U.S. PATENT DOCUMENTS

| | | | | |
|---|---|---|---|---|
| 6,996,070 B2* | 2/2006 | Starr | ....................... | H04L 69/12 714/21 |
| 7,376,755 B2* | 5/2008 | Pandya | ................ | H04L 69/163 709/212 |
| 7,668,165 B2* | 2/2010 | Hoskote | ................. | H04L 69/32 718/100 |
| 7,934,021 B2* | 4/2011 | Elzur | .................. | H04L 67/1097 709/229 |

(Continued)

FOREIGN PATENT DOCUMENTS

EP    3671477 A1    6/2020

OTHER PUBLICATIONS

European Extended Search Report mailed in corresponding EP Application No. 22162032.1 on Jul. 18, 2022, 9 pages.

(Continued)

*Primary Examiner* — Alpus Hsu
(74) *Attorney, Agent, or Firm* — Tong, Rea, Bentley & Kim, LLC

(57) ABSTRACT

Various example embodiments for supporting communications for data storage are presented herein. Various example embodiments for supporting communications for data storage may be configured to support communications between a host and a storage element for supporting storage of data in the storage element by the host. Various example embodiments for supporting communications between a host and a storage element may be configured to support communications between a host and a controller of the storage element.

(Continued)

Various example embodiments for supporting communications between a host and a controller of a storage element may be configured to support, using a single transport layer connection, communications of multiple queue pairs supporting communications between the host and the controller of the storage element, where each of the queue pairs includes a queue on the host and a queue on the controller of the storage element.

24 Claims, 34 Drawing Sheets

(56) References Cited

U.S. PATENT DOCUMENTS

| | | | | |
|---|---|---|---|---|
| 9,112,819 B2* | 8/2015 | Gopinath | ............ | H04L 49/9047 |
| 9,736,211 B2* | 8/2017 | Veeraiyan | ........... | H04L 12/4633 |
| 10,880,204 B1 | 12/2020 | Shalev et al. | | |
| 2016/0344634 A1* | 11/2016 | Ronciak | ................ | H04L 47/125 |
| 2019/0222649 A1* | 7/2019 | Cheng | ................. | H04L 67/1097 |
| 2020/0293465 A1* | 9/2020 | Yang | ....................... | H04L 49/70 |
| 2020/0326879 A1 | 10/2020 | Zhang et al. | | |

OTHER PUBLICATIONS

NVM Express Workgroup, "NMV Express—Base Specification—Revision 1.4b," NVM Express, Sep. 21, 2020.
NVM Express Workgroup, "NMV Express Over Fabrics—Revision 1.1," NVM Express, Oct. 22, 2019.
Ford et al., "TCP Extensions for Multipath Operation with Multiple Addresses," IETF RFC 8684, Mar. 2020.
Bensley et al., "Data Center TCP (DCTCP): TCP Congestion Control for Data Centers," IETF RFC 8257, Oct. 2017.

* cited by examiner

*FIG. 4*

| Bytes | Description |
|---|---|
| 00 | PDU-Type: Specifies the type of PDU. This value is also referred to as the PDU opcode. |
| 01 | FLAGS: PDU-Type specific flags.<br><br>| Bits | Definition |<br>|---|---|<br>| 7:2 | Reserved |<br>| 1 | QUEUE_ID_PRESENT: If set to '1', the Queue-ID field is present. |<br>| 0 | MQ_CAPABLE: If set to '1', the sender of the PDU is MQ-NVMe/TCP capable. | |
| 02 | Header Length (HLEN): Length of PDU header (not including the Header Digest) in bytes. |
| 03 | PDU Data Offset (PDO): PDU Data Offset from the start of the PDU in bytes. |
| 07:04 | PDU Length (PLEN): Total length of PDU (includes CH, PSH, HDGST, PAD, DATA, and DDGST) in bytes. |
| 09:08 | Queue ID (QID): This field is OPTIONAL and present only when QUEUE_ID_PRESENT bit in Flags field is set to '1'. This field specifies the Queue Identifier for the Admin Queue or I/O Queue. The identifier for the Admin Queue is 0h. The identifier for an I/O Queue is in the range 1 to 65,534. |

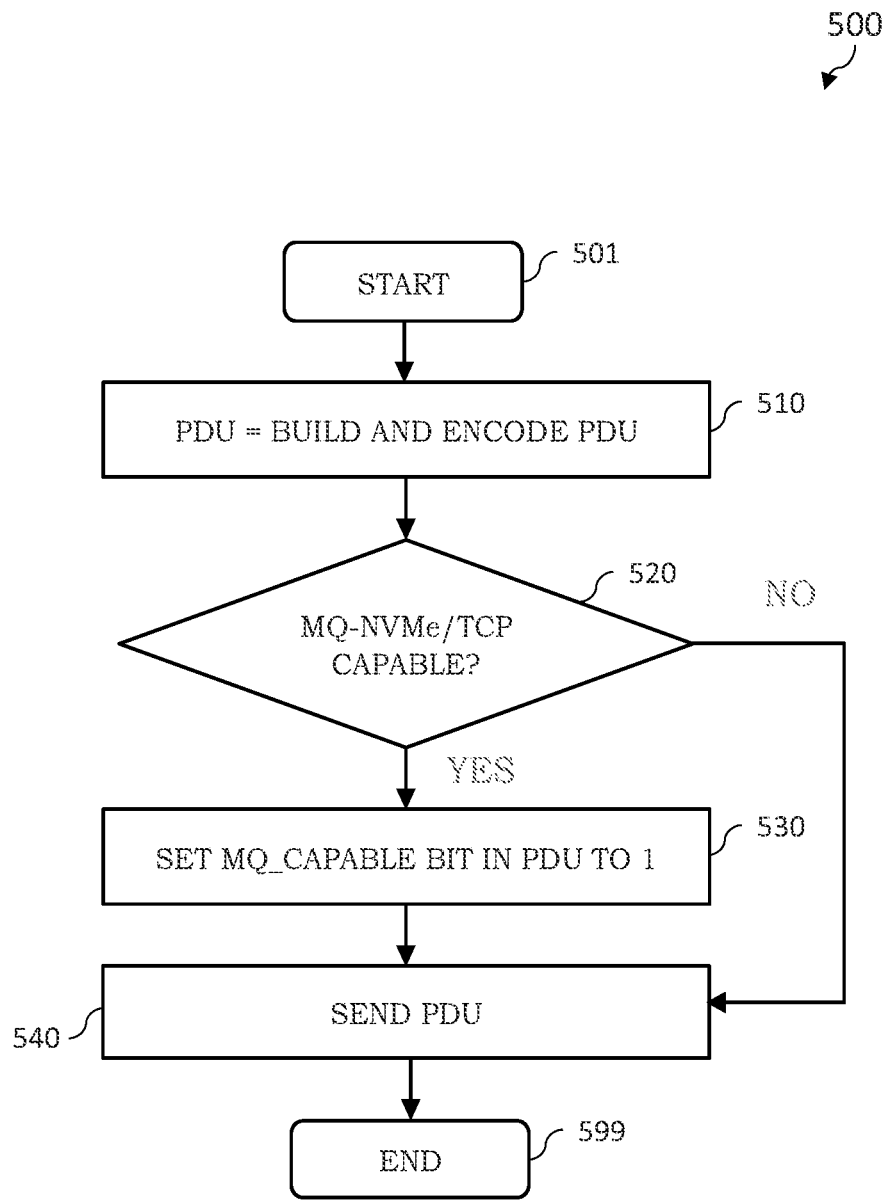

FIG. 10

ICReq PDU
1000

| Bytes | PDU Section | Description |
|---|---|---|
| 00 | CH | PDU-Type: 00h |
| 01 | | FLAGS: PDU-Type Specific Tags (MQ_CAPABLE) |
| 02 | | HLEN: Fixed length of 128 bytes (80h). |
| 03 | | PDO: Reserved |
| 07:04 | | PLEN: Fixed length of 128 bytes (80h). |
| 09:08 | PSH | PDU Format Version (PFV): Specifies the format version of NVMe/TCP PDUs. The format of the record specified in this definition shall be cleared to 0h. |
| 10 | | Host PDU Data Alignment (HPDA): Specifies the data alignment for all PDUs transferred from the controller to the host that contain data. This value is 0's based value in units of dwords, and must be a value in the range 0 to 31 (e.g. values 0, 1, and 2 correspond to 4 byte, 8 byte, and 12 byte alignment). |
| | | DGST: Host PDU header and Data digest enable options. |
| 11 | | Bits \| Definition |
| | | 7:2 \| Reserved |
| | | 1 \| DDGST_ENABLE: If set to '1', the use of data digest is requested by the host for the connection. If cleared to '0', data digest shall not be used for the connection. |
| | | 0 \| HDGST_ENABLE: If set to '1', the use of header digest is requested by the host for the connection. If cleared to '0', header digest shall not be used for the connection. |
| 15:12 | | Maximum Number of Outstanding R2T (MAXR2T): Specifies the maximum number of outstanding R2T PDUs for a command at any point in time on the connection. This is a 0's based value. |
| 127:16 | | Reserved |

FIG. 11

ICResp PDU 1100

| Bytes | PDU Section | Description |
|---|---|---|
| 00 | CH | PDU-Type: 01h |
| 01 | | FLAGS: PDU-Type Specific Tags (MQ_CAPABLE) |
| 02 | | HLEN: Fixed length of 128 bytes (80h). |
| 03 | | PDO: Reserved |
| 07:04 | | PLEN: Fixed length of 128 bytes (80h). |
| 09:08 | PSH | PDU Format Version (PFV): Specifies the format version of NVMe/TCP PDUs. The format of the record specified in this definition shall be cleared to 0h. |
| 10 | | Controller PDU Data Alignment (CPDA): Specifies the data alignment for all PDUs transferred from the host to the controller that contain data. This value is 0's based value in units of dwords in the range 0 to 31 (e.g., values 0, 1, and 2 correspond to 4 byte, 8 byte, and 12 byte alignment). |
| 11 | | DGST: PDU and Data Digest enable options.<br><br>\| Bits \| Definition \|<br>\|---\|---\|<br>\| 7:2 \| Reserved \|<br>\| 1 \| DDGST_ENABLE: If set to '1', data digest is used for the connection. If cleared to '0', data digest is not used for the connection. \|<br>\| 0 \| HDGST_ENABLE: If set to '1', header digest is used for the connection. If cleared to '0', header digest is not used for the connection. \| |
| 15:12 | | Maximum Host to Controller Data length (MAXH2CDATA): Specifies the maximum number of PDU-Data bytes per H2C Data Transfer PDU in bytes. This value is a multiple of dwords and should be no less than 4,096. |
| 127:16 | | Reserved |

*FIG. 12A*

H2CTermReq PDU 1200

| Bytes | PDU Section | Description |
|---|---|---|
| 00 | CH | PDU-Type: 02h |
| 01 | | FLAGS: Reserved |
| 02 | | HLEN: Fixed length of 24 bytes (18h) |
| 03 | | PDO: Reserved |
| 07:04 | | PLEN: Total length of PDU (including PDU header and DATA) in bytes. This value shall not exceed a limit of 152 bytes. |
| 09:08 | PSH | Fatal Error Status (FES): Indicates the fatal error information. <br><br> <table><tr><th>Value</th><th>Description</th></tr><tr><td>00h</td><td>Reserved</td></tr><tr><td>01h</td><td>Invalid PDU Header Field: An invalid Field in the Transport Header was detected by the host.</td></tr><tr><td>02h</td><td>PDU Sequence Error: An unexpected Protocol sequence was detected by the host.</td></tr><tr><td>03h</td><td>Header Digest Error: A Header Digest (HDGST) error was detected by the host.</td></tr><tr><td>04h</td><td>Data Transfer Out of Range: A C2HData with data offset or data offset plus data length is out of its associated command data buffer range.</td></tr><tr><td>05h</td><td>R2T Limit Exceeded: An R2T PDU that exceeds MAXR2T was received by the host.</td></tr><tr><td>06h</td><td>Unsupported Parameter: An unsupported parameter was received by the host.</td></tr><tr><td>07h to FFFFh</td><td>Reserved</td></tr></table> |

*FIG. 12B*

H2CTermReq PDU 1200

| Bytes | PDU Section | Description |
|---|---|---|
| 13:10 | | Fatal Error Information (FEI): Provides additional information based on the Fatal Error Status field. <table><tr><th>Fatal Error Status</th><th>Contents of Error Specific Information</th></tr><tr><td>00</td><td>Reserved</td></tr><tr><td>01h</td><td>PDU Header Field Offset: This field indicates the offset in bytes from the start of the PDU Header to the start of the field that is in error. If multiple errors exist, then this field indicates the lowest offset that is in error.</td></tr><tr><td>02h</td><td>Reserved</td></tr><tr><td>03h</td><td>PDU Header Digest: This field indicates the header digest that was received by the host and caused a header digest verification error.</td></tr><tr><td>04h to 05h</td><td>Reserved</td></tr><tr><td>06h</td><td>Unsupported Parameter Field Offset: This field indicates the offset in bytes from the start of the PDU Header to the start of the field that is in error. If multiple errors exist, then this field indicates the lowest offset that is in error.</td></tr><tr><td>07h to FFFFh</td><td>Reserved</td></tr></table> |
| 23:14 | | Reserved |
| N-1:24 | DATA | Data: This field contains the PDU header that was being processed by the host while the fatal error was detected. |

*FIG. 13*

C2HTermReq PDU 1300

| Bytes | PDU Section | Description | | |
|---|---|---|---|---|
| 00 | 0H | PDU-Type: 03h | | |
| 01 | | FLAGS: Reserved | | |
| 02 | | HLEN: Fixed length of 24 bytes (18h). | | |
| 03 | | PDO: Reserved | | |
| 07:04 | | PLEN: Total length of PDU (including PDU header and DATA) in bytes. This value shall not exceed a limit of 152 bytes. | | |
| 09:08 | PSH | Fatal Error Status (FES): Indicates the fatal error information. | | |
| | | Value | Description | |
| | | 00h | Reserved | |
| | | 01h | Invalid PDU Header Field: An invalid Field in the Transport Header was detected by the controller. | |
| | | 02h | PDU Sequence Error: An unexpected Protocol sequence was detected by the controller. | |
| | | 03h | Header Digest Error: A Header Digest (HDGST) error was detected by the controller. | |
| | | 04h | Data Transfer Out of Range: A H2CData with data offset or data offset plus data length is out of its associated R2T range. | |
| | | 05h | Data Transfer Limit Exceeded: A H2CData PDU with data length that exceeds MAXH2CDATA was received by the controller. | |
| | | 06h | Unsupported Parameter: An unsupported parameter was received by the controller. | |
| | | 07h to FFFFh | Reserved | |

*FIG. 14A*

Connect Request SQE
1400

| Bytes | Description |
|---|---|
| 00 | Opcode (OPC): Set to 7Fh to indicate a Fabrics command. |
| 01 | Reserved |
| 03:02 | Command Identifier (CID): This field specifies a unique identifier for the command. Refer to the definition in Figure 7. |
| 04 | Fabrics Command Type (FCTYPE): Set to 01h to indicate a Connect command. |
| 23:05 | Reserved |
| 39:24 | SGL Descriptor 1 (SGL1): This field contains a Transport SGL Data Block descriptor or a Keyed SGL Data Block descriptor that describes the entire data transfer. Refer to section 4.4 of the NVMe Base specification for the definition of SGL descriptors. |
| 41:40 | Record Format (RECFMT): Specifies the format of the Connect command capsule. The format of the record specified in this definition shall be 0h. If the NVM subsystem does not support the value specified, then a status value of Incompatible Format shall be returned. |
| 43:42 | Queue ID (QID): Specifies the Queue Identifier for the Admin Queue or I/O Queue to be created. The identifier is used for both the Submission Queue and Completion Queue. The identifier for the Admin Submission Queue and Completion Queue is 0h. The identifier for an I/O Submission and Completion Queue is in the range 1 to 65,534. |
| 45:44 | Submission Queue Size (SQSIZE): This field indicates the size of the Submission Queue to be created. If the size is 0h or larger than the controller supports, then a status value of Connect Invalid Parameters shall be returned. The maximum size of the Admin Submission Queue is specified in the Discovery Log entry for the NVM subsystem. Refer to section 4.1.3 of the NVMe Base specification. This is a 0's based value. |

FIG. 14B

Connect Request SQE 1400

| | |
|---|---|
| 46 | Connect Attributes (CATTR): This field indicates attributes for the connection.<br><br>Bits 7:4 are reserved.<br><br>Bit 3 indicates support for deleting individual I/O Queues. If this bit is set to '1', then the host supports the deletion of individual I/O Queues. If this bit is cleared to '0', then the host does not support the deletion of individual I/O Queues.<br><br>Bit 2 if set to '1', then the host is requesting that SQ flow control be disabled. If cleared to '0', then SQ flow control shall not be disabled.<br><br>Bits 1:0 indicate the priority class to use for commands within this Submission Queue. This field is only used when the weighted round robin with urgent priority class is the arbitration mechanism selected, the field is ignored if weighted round robin with urgent priority class is not used. Refer to section 4.13 of the NVMe Base specification. This field is only valid for I/O Queues. It shall be set to 00b for Admin Queue connections.<br><br>| Value | Definition |<br>\|---\|---\|<br>\| 00b \| Urgent \|<br>\| 01b \| High \|<br>\| 10b \| Medium \|<br>\| 11b \| Low \| |
| 47 | Reserved |

| Bytes | Description |
|---|---|
| 51:48 | Keep Alive Timeout (KATO): In the Connect command for the Admin Queue, this field has the same definition as the Keep Alive Timeout (Keep Alive Timer) defined in section 5.21.1.15 of the NVMe Base specification. Upon successful completion of the Connect command the controller shall enable and activate the Keep Alive timer as described in section 7.12 (Keep Alive) of the NVMe Base specification.<br><br>In the Connect command for an I/O Queue, this field is reserved. |
| 63:52 | Reserved |

FIG. 15

CapsuleCmd PDU 1500

| Bytes | PDU Section | Description |
|---|---|---|
| 00 | | PDU-Type: 04h |
| 01 | CH | FLAGS: <table><tr><th>Bits</th><th>Description</th></tr><tr><td>7:2</td><td>(2) PDU-Type Specific Tags (QUEUE_ID_PRESENT) and (3-7) Reserved</td></tr><tr><td>1</td><td>DDGSTF: If set to '1', then a valid Data digest value follows the PDU Data.</td></tr><tr><td>0</td><td>HDGSTF: If set to '1', then a valid Header digest value follows the PDU header.</td></tr></table> |
| 02 | | HLEN: Fixed length of 72 bytes (48h). |
| 03 | QUEUE-ID | PDO: Data Offset within PDU. This value complies to the CPDA field set by the controller in ICResp PDU (refer to section 7.4.10.3). |
| 07:04 | PSH | PLEN: Total length of PDU (including PDU header, HDGST, PAD, DATA, and DDGST) in bytes. |
| 71:08 | | NVMe-oF Command Capsule SQE (CCSQE): NVMe-oF Command Capsule SQE. |
| 75:72 | HDGST | HDGST: If HDGSTF is set in the FLAGS field, this field is present and contains the Header digest. |
| N-1:76 | PAD | PAD: If in-capsule data is present, the length of this shall be the necessary number of bytes required to achieve the alignment specified by CPDA. |
| M-1:N | DATA | NVMe-oF In-Capsule Data (CCICD): This field contains the in-capsule data, if any, of the NVMe-oF Command Capsule. |
| M+3:M | DDGST | Data Digest (DDGST): If DDGSTF is set in the FLAGS field, and the CCICD field is present, then this field contains the Data Digest of the CCICD field (in-capsule data). |

FIG. 16

Command/SQE Format 1600

| Bytes | Description |
|---|---|
| 03:00 | Command Dword 0 (CDW0): This field is common to all commands and is defined in Figure 11-E-2 |
| 07:04 | Namespace Identifier (NSID): This field specifies the namespace that this command applies to. A namespace is a collection of logical blocks where bloc addresses range fromm 0 to size of the name space. If the namespace identifier is not used for the command, then this field shall be cleared to 0h. The value FFFFFFFFh in this field is a broadcast value and means all name spaces used in NMV sub-system. |
| 15:08 | Reserved |
| 23:16 | Metadata Pointer (MPTR): This field is valid only if the command has metadata that is not interleaved with the logical block data, as specified in the Format NVM command. This is a reserved field in NVMe-oF implementations. |
| 39:24 | Data Pointer (DPTR): This field specifies the data used in the command. |
| 43:40 | Command Dword 10 (CDW10): This field is command specific Dword 10. |
| 47:44 | Command Dword 11 (CDW11): This field is command specific Dword 11. |
| 51:48 | Command Dword 12 (CDW12): This field is command specific Dword 12. |
| 55:52 | Command Dword 13 (CDW13): This field is command specific Dword 13. |
| 59:56 | Command Dword 14 (CDW14): This field is command specific Dword 14. |
| 63:60 | Command Dword 10 (CDW15): This field is command specific Dword 15. |

*FIG. 17*

Command Dword 0 Format
1700

| Bits | Description |
|------|-------------|
| 31:16 | Command Identifier (CID): This field specifies a unique identifier for the command when combined with the Submission Queue identifier. The value of FFFFh should not be used as the Error Information log page (refer to section 5.14.1.1) uses this value to indicate an error is not associated with a particular command. |
| 15:14 | PRP or SGL for Data Transfer (PSDT): This field specifies whether PRPs or SGLs are used for any data transfer associated with the command. PRPs shall be used for all Admin commands for NVMe over PCIe implementations. SGLs shall be used for all Admin and I/O commands for NVMe over Fabrics implementations. This field shall be set to 01b for NVMe over Fabrics revision 1.0 implementations. The definition is described in the table below.<br><br>  | Value | Definition |<br>  |-------|------------|<br>  | 00b | PRPs are used for this transfer |<br>  | 01b | SGLs are used for this transfer. If used, Metadata Pointer (MPTR) contains an address of a single contiguous physical buffer that is byte aligned. |<br>  | 10b | SGLs are used for this transfer. If used, Metadata Pointer (MPTR) contains an address of an SGL segment containing exactly one SGL Descriptor that is qword aligned. |<br>  | 11b | Reserved |<br><br>If there is metadata that is not interleaved with the logical block data, as specified in the Format NVM command, then the Metadata Pointer (MPTR) field is used to point to the metadata. The definition of the Metadata Pointer field is dependent on the setting in this field. Refer to Figure 106. |
| 13:10 | Reserved |
| 09:08 | Fused Operation (FUSE): In a fused operation, a complex command is created by "fusing" together two simpler commands. Refer to section 4.12. This field specifies whether this command is part of a fused operation and if so, which command it is in the sequence.<br><br>  | Value | Definition |<br>  |-------|------------|<br>  | 00b | Normal operation |<br>  | 01b | Fused operation, first command |<br>  | 10b | Fused operation, second command |<br>  | 11b | Reserved | |
| 07:00 | Opcode (OPC): This field specifies the opcode of the command to be executed. |

*FIG. 18*

NVMe-oF Command SQE 1800

| Bytes | Description |
|---|---|
| 00 | Opcode (OPC): Set to 7Fh to indicate a Fabrics command. |
| 01 | Reserved |
| 03:02 | Command Identifier (CID): This field specifies a unique identifier for the command. The identifier shall be unique among all outstanding commands associated with a particular queue. |
| 04 | Fabrics Command Type (FCTYPE): This field specifies the Fabrics command transferred in the capsule. The Fabrics command types are defined in Figure 14. If this field is set to a reserved value, the command should be aborted with a status code of Invalid Field in Command. |
| 39:05 | Reserved |
| 63:40 | Fabrics Command Type Specific: This field is Fabrics command type specific. |

*FIG. 19*

Connect Response CQE
1900

| Bytes | Description |
|---|---|
| 03:00 | Status Code Specific: The value is dependent on the status returned. Refer to Figure 22. |
| 07:04 | Reserved |
| 09:08 | SQ Head Pointer (SQHD): If the Connect command requested that SQ flow control be disabled, then a value of FFFFh in this field indicates that SQ flow control is disabled for the created queue pair. Otherwise, this field indicates the current Submission Queue Head pointer for the associated Submission Queue and also indicates that SQ flow control is enabled for the created queue pair. |
| 11:10 | Reserved |
| 13:12 | Command Identifier (CID): Indicates the identifier of the command that is being completed. |
| 15:14 | Status (STS): Specifies status for the command. Refer to section 2.2.1 for values specific to the Connect command. |

*FIG. 20*

CapsuleResp PDU 2000

| Bytes | PDU Section | Description |
|---|---|---|
| 00 | | PDU-Type: 05h |
| 01 | | FLAGS: <table><tr><td>Bits</td><td>Description</td></tr><tr><td>7:1</td><td>Reserved</td></tr><tr><td>0</td><td>HDGSTF: If set to "1", then a valid Header digest value follows the PDU header.</td></tr></table> |
| 02 | CH | HLEN: Fixed length of 24 bytes (18h). |
| 03 | | PDO: Reserved |
| 07:04 | | PLEN: Length of PDU Header and HDGST (if present) in bytes. |
| 23:08 | QUEUE-ID / PSH | NVMe-oF Response Capsule CQE (RCCQE): Response Capsule CQE. |
| 27:24 | HDGST | HDGST: If HDGSTF is set in the FLAGS field, this field is present and contains the Header digest. |

*FIG. 21*

NVMe-oF Command Response CQE 2100

| Bytes | Description |
|---|---|
| 07:00 | The definition of this field is Fabrics response type specific. |
| 09:08 | SQ Head Pointer (SQHD): Indicates the current Submission Queue Head pointer for the associated Submission Queue[1]. |
| 11:10 | Reserved |
| 13:12 | Command Identifier (CID): Indicates the identifier of the command that is being completed. |

*FIG. 22*

H2CData PDU 2200

| Bytes | PDU Section | Description |
|---|---|---|
| 00 | | PDU-Type: 06h |
| 01 | CH | FLAGS:<br><br>| Bits | Description |<br>|---|---|<br>| 7:3 | (3) PDU-Type Specific Tags (QUEUE_ID_PRESENT) and (4-7) Reserved |<br>| 2 | LAST_PDU: If set to '1', indicates the PDU is the last in the set of H2CData PDUs that correspond to the same R2T PDU. |<br>| 1 | DDGSTF: If set to '1', then a valid Data digest value follows the PDU Data. |<br>| 0 | HDGSTF: If set to '1', then a valid Header digest value follows the PDU header. |  |
| 02 | QUEUE-ID | |
| 03 | | HLEN: Fixed length of 24 bytes (18h). |
| 07:04 | | PDO: Data Offset within PDU. This value complies to the CPDA field set by the controller in ICResp PDU (refer to section 7.4.9.3). |
| 09:08 | | PLEN: Total length of PDU (including PDU header HDGST, PAD, DATA, and DDGST) in bytes. |
| 11:10 | PSH | Command Capsule CID (CCCID): This field contains the SQE CID value of the Command Capsule associated with the command data buffer. |
| 15:12 | | Transfer Tag (TTAG): This field contains the Transfer Tag of the corresponding R2T received by the controller. |
| 19:16 | | Data Offset (DATAO): Byte offset from start of Command data buffer. This value shall be a multiple of dwords. |
| 23:20 | | Data Length (DATAL): PDU DATA field length in bytes. This value shall be a multiple of dwords. |
| 27:24 | HDGST | Reserved |
| | | HDGST: If HDGSTF is set in the FLAGS field, this field is present and contains the Header digest. |
| N - 1:N | PAD | PAD: The length of this shall be the necessary number of bytes required to achieve the alignment specified by CPDA. |
| M - 1:N | DATA | PDU-Data |
| M + 3:M | DDGST | Data Digest (DDGST): If DDGSTF is set in the FLAGS field, this field is present and contains the data digest. |

*FIG. 23*

C2HData PDU 2300

| Bytes | PDU Section | Description |
|---|---|---|
| 00 | | PDU-Type: 07h |
| 01 | CH | FLAGS: <table><tr><th>Bits</th><th>Description</th></tr><tr><td>7:4</td><td>(4) PDU-Type Specific Tags (QUEUE_ID_PRESENT) and (5-7) Reserved</td></tr><tr><td>3</td><td>SUCCESS: If set to '1', indicates that the command referenced by CCCID was completed successfully with no other information and that no response PDU is sent by the Controller.</td></tr><tr><td>2</td><td>LAST_PDU: If set to '1', indicates the PDU is the last in the Command Data transfer series.</td></tr><tr><td>1</td><td>DDGSTF: If set to '1', then a valid Data digest value follows the PDU Data.</td></tr><tr><td>0</td><td>HDGSTF: If set to '1', then a valid Header digest value follows the PDU header.</td></tr></table> |
| 02 | QUEUE-ID | HLEN: Fixed length of 24 bytes (18h) |
| 03 | | PDO: Data Offset within PDU. This value complies to the HPDA field set by the controller in ICReq PDU (refer to section 7.4.9.2). |
| 07:04 | | PLEN: Total length of PDU (including PDU header, HDGST, PAD, DATA, and DDGST) in bytes. |
| 09:08 | | Command Capsule CID (CCCID): This field contains the SQE.CID value of the Command Capsule associated with the host resident data. |
| 11:10 | | Reserved |
| 15:12 | | Data Offset (DATAO): Byte offset from start of host resident data. This value shall be dword aligned. |
| 19:16 | PSH | Data Length (DATAL): PDU DATA field length in bytes. This value shall be dword aligned. |
| 23:20 | | Reserved |
| 27:24 | HDGST | HDGST: If HDGSTF is set in the FLAGS field, this field is present and contains the Header digest. |
| N-1:N | PAD | PAD: If HPDA is set to a non-zero value, then this field is padded as specified by HPDA. |
| M-1:N | DATA | PDU-Data |
| M+3:M | DDGST | Data Digest (DDGST): Data Digest of PDU-Data field |

*FIG. 24*

R2T PDU 2400

| Bytes | PDU Section | Description |
|---|---|---|
| 00 | | PDU-Type: 09h |
| 01 | | FLAGS: <table><tr><td>Bits</td><td>Description</td></tr><tr><td>7:1</td><td>(1) PDU-Type Specific Tags (QUEUE_ID_PRESENT) and (2-7) Reserved</td></tr><tr><td>0</td><td>HDGSTF: If set to '1', then a valid Header digest value follows the PDU header.</td></tr></table> |
| 02 | CH | HLEN: Fixed length of 24 bytes (18h). |
| 03 | | PDO: Reserved |
| 07:04 | QUEUE-ID | PLEN: Length of PDU Header and HDGST (if present) in bytes. |
| 09:08 | | Command Capsule CID (CCCID): This field contains the SQE.CID value of the Command Capsule associated with the host resident data. |
| 11:10 | PSH | Transfer Tag (TTAG): This field contains a controller generated tag. The rules of the tag generation are completely up to the controller discretion. |
| 15:12 | | Requested Data Offset (R2TO): Byte offset from the start of the host-resident data. This value shall be dword aligned. |
| 19:16 | | Requested Data Length (R2TL): Number of bytes of command data buffer requested by the controller. This value shall be dword aligned. |
| 23:20 | | Reserved |
| 27:24 | HDGST | HDGST: If HDGSTF is set in the FLAGS field, this field is present and contains the Header digest. |

*FIG. 25*

Disconnect Request SQE 2500

| Bytes | Description |
|---|---|
| 00 | Opcode (OPC): Set to 7Fh to indicate a Fabrics command. |
| 01 | Reserved |
| 03:02 | Command Identifier (CID): This field specifies a unique identifier for the command. Refer to the definition in Figure 7. |
| 04 | Fabrics Command Type (FCTYPE): Set to 08h to indicate a Disconnect command. |
| 23:05 | Reserved |
| 39:24 | SGL Descriptor 1 (SGL1): This field is reserved, as there is no data transferred by this command. |
| 41:40 | Record Format (RECFMT): Specifies the format of the Disconnect command capsule. The format of the record specified in this definition shall be 0h. If the NVM subsystem does not support the value specified, then a status value of Incompatible Format shall be returned. |
| 63:48 | Reserved |

*FIG. 26*

Disconnect Response CQE 2600

| Bytes | Description |
|---|---|
| 07:00 | Reserved |
| 09:08 | SQ Head Pointer (SQHD): Indicates the current Submission Queue Head pointer for the associated Submission Queue. |
| 11:10 | Reserved |
| 13:12 | Command Identifier (CID): Indicates the identifier of the command that is being completed. |
| 15:14 | Status (STS): Specifies status for the command. Refer to section 2.2.1 for values specific to the Disconnect command. |

SUPPORTING COMMUNICATIONS FOR DATA STORAGE

TECHNICAL FIELD

Various example embodiments relate generally to communications and, more particularly but not exclusively, to supporting communications for data storage.

BACKGROUND

In various contexts, various communications technologies may be used to support various types of communications.

SUMMARY

In at least some example embodiments, an apparatus includes at least one processor and at least one memory including a set of instructions, wherein the set of instructions is configured to, when executed by the at least one processor, cause the apparatus to support, by a host based on a transport layer connection with a controller of a storage element, communications for multiple queues on the host, wherein each queue of the multiple queues includes a respective send queue configured to support sending of communications toward a respective receive queue on the controller of the storage element and a respective receive queue configured to support receiving of communications from a respective send queue on the controller of the storage element. In at least some example embodiments, a non-transitory computer-readable medium stores a set of instructions configured to cause an apparatus to support, by a host based on a transport layer connection with a controller of a storage element, communications for multiple queues on the host, wherein each queue of the multiple queues includes a respective send queue configured to support sending of communications toward a respective receive queue on the controller of the storage element and a respective receive queue configured to support receiving of communications from a respective send queue on the controller of the storage element. In at least some example embodiments, a method includes supporting, by a host based on a transport layer connection with a controller of a storage element, communications for multiple queues on the host, wherein each queue of the multiple queues includes a respective send queue configured to support sending of communications toward a respective receive queue on the controller of the storage element and a respective receive queue configured to support receiving of communications from a respective send queue on the controller of the storage element. In at least some example embodiments, an apparatus includes means for supporting, by a host based on a transport layer connection with a controller of a storage element, communications for multiple queues on the host, wherein each queue of the multiple queues includes a respective send queue configured to support sending of communications toward a respective receive queue on the controller of the storage element and a respective receive queue configured to support receiving of communications from a respective send queue on the controller of the storage element. In at least some example embodiments, an apparatus includes at least one processor and at least one memory including a set of instructions, wherein the set of instructions is configured to, when executed by the at least one processor, cause the apparatus to support, by a controller of a storage element based on a transport layer connection with a host, communications for multiple queues on the controller of the storage element, wherein each queue of the multiple queues includes a respective send queue configured to support sending of communications toward a respective receive queue on the host and a respective receive queue configured to support receiving of communications from a respective send queue on the host. In at least some example embodiments, a non-transitory computer-readable medium stores a set of instructions configured to cause an apparatus to support, by a controller of a storage element based on a transport layer connection with a host, communications for multiple queues on the controller of the storage element, wherein each queue of the multiple queues includes a respective send queue configured to support sending of communications toward a respective receive queue on the host and a respective receive queue configured to support receiving of communications from a respective send queue on the host. In at least some example embodiments, a method includes supporting, by a controller of a storage element based on a transport layer connection with a host, communications for multiple queues on the controller of the storage element, wherein each queue of the multiple queues includes a respective send queue configured to support sending of communications toward a respective receive queue on the host and a respective receive queue configured to support receiving of communications from a respective send queue on the host. In at least some example embodiments, an apparatus includes means for supporting, by a controller of a storage element based on a transport layer connection with a host, communications for multiple queues on the controller of the storage element, wherein each queue of the multiple queues includes a respective send queue configured to support sending of communications toward a respective receive queue on the host and a respective receive queue configured to support receiving of communications from a respective send queue on the host.

In at least some example embodiments, an apparatus includes at least one processor and at least one memory including a set of instructions, wherein the set of instructions is configured to, when executed by the at least one processor, cause the apparatus to support, based on a set of multiple transport layer connections, communication between a queue on a host and a queue on a controller of a storage element. In at least some example embodiments, a non-transitory computer-readable medium stores a set of instructions configured to cause an apparatus to support, based on a set of multiple transport layer connections, communication between a queue on a host and a queue on a controller of a storage element. In at least some example embodiments, a method includes supporting, based on a set of multiple transport layer connections, communication between a queue on a host and a queue on a controller of a storage element. In at least some example embodiments, an apparatus includes means for supporting, based on a set of multiple transport layer connections, communication between a queue on a host and a queue on a controller of a storage element. In at least some example embodiments, an apparatus includes at least one processor and at least one memory including a set of instructions, wherein the set of instructions is configured to, when executed by the at least one processor, cause the apparatus to support, by a host based on a set of multiple transport layer connections, communications for a queue on the host, wherein the queue on the host includes a send queue configured to support sending of communications toward a receive queue on the controller of the storage element and a receive queue configured to support receiving of communications from a send queue on the controller of the storage element. In at least some example embodiments, a non-transitory computer-readable medium stores a set of instructions configured to cause an apparatus to support, by a host based on a set of multiple transport layer connections, communications for a queue on the host, wherein the queue on the host includes a send queue configured to support sending of communications toward a receive queue on the controller of the storage element and a receive queue configured to support receiving of communications from a send queue on the controller of the storage element. In at least some example embodiments, a method includes supporting, by a host based on a set of multiple transport layer connections, communications for a queue on the host, wherein the queue on the host includes a send queue configured to support sending of communications toward a receive queue on the controller of the storage element and a receive queue configured to support receiving of communications from a send queue on the controller of the storage element. In at least some example embodiments, an apparatus includes means for supporting, by a host based on a set of multiple transport layer connections, communications for a queue on the host, wherein the queue on the host includes a send queue configured to support sending of communications toward a receive queue on the controller of the storage element and a receive queue configured to support receiving of communications from a send queue on the controller of the storage element. In at least some example embodiments, an apparatus includes at least one processor and at least one memory including a set of instructions, wherein the set of instructions is configured to, when executed by the at least one processor, cause the apparatus to support, by a controller of a storage element based on a set of multiple transport layer connections, communications for a queue on the controller of the storage element, wherein the queue on the controller of the storage element includes a receive queue configured to support receiving of communications from a send queue on the host and a send queue configured to support sending of communications toward a receive queue on the host. In at least some example embodiments, a non-transitory computer-readable medium stores a set of instructions configured to cause an apparatus to support, by a controller of a storage element based on a set of multiple transport layer connections, communications for a queue on the controller of the storage element, wherein the queue on the controller of the storage element includes a receive queue configured to support receiving of communications from a send queue on the host and a send queue configured to support sending of communications toward a receive queue on the host. In at least some example embodiments, a method includes supporting, by a controller of a storage element based on a set of multiple transport layer connections, communications for a queue on the controller of the storage element, wherein the queue on the controller of the storage element includes a receive queue configured to support receiving of communications from a send queue on the host and a send queue configured to support sending of communications toward a receive queue on the host. In at least some example embodiments, an apparatus includes means for supporting, by a controller of a storage element based on a set of multiple transport layer connections, communications for a queue on the controller of the storage element, wherein the queue on the controller of the storage element includes a receive queue configured to support receiving of communications from a send queue on the host and a send queue configured to support sending of communications toward a receive queue on the host.

BRIEF DESCRIPTION OF THE DRAWINGS

The teachings herein can be readily understood by considering the following detailed description in conjunction with the accompanying drawings, in which:

FIG. 4 depicts an example embodiment of a common header for a PDU structure for MQ-NVMe/TCP;

FIG. 5 depicts an example embodiment of a method for use by an initiator of an NVMe/TCP connection to initiate the NVMe/TCP connection;

FIG. 10 depicts an example embodiment of an Initiate Connection Request (ICReq) PDU configured for use in MQ-NVMe/TCP;

FIG. 11 depicts an example embodiment of an Initiate Connection Response (ICResp) PDU configured for use in MQ-NVMe/TCP;

FIGS. 12A and 12B depict an example embodiment of a Host to Controller Terminate Connection Request (H2CTermReq) PDU configured for use in MQ-NVMe/TCP;

FIG. 13 depicts an example embodiment of a Controller to Host Terminate Connection Request (C2HTermReq) PDU configured for use in MQ-NVMe/TCP;

FIGS. 14A and 14B depict an example embodiment of a Connect Request SQE configured for use in MQ-NVMe/TCP;

FIG. 15 depicts an example embodiment of a Command Capsule (CapsuleCmd) PDU configured for use in MQ-NVMe/TCP;

FIG. 16 depicts an example embodiment of a Command/SQE format for use in a CapsuleCmd PDU configured for use in MQ-NVMe/TCP;

FIG. 17 depicts an example embodiment of a Command Dword 0 for use in a Command/SQE format for use in a CapsuleCmd PDU configured for use in MQ-NVMe/TCP;

FIG. 18 depicts an example embodiment of an NVMe-oF Command SQE for use in a Fabrics Command for use in a CapsuleCmd PDU configured for use in MQ-NVMe/TCP;

FIG. 19 depicts an example embodiment of a Connect Response CQE configured for use in MQ-NVMe/TCP;

FIG. 20 depicts an example embodiment of a Capsule Response (CapsuleResp) PDU configured for use in MQ-NVMe/TCP;

FIG. 21 depicts an example embodiment of an NVMe-oF Command Response CQE for use in a CapsuleResp PDU configured for use in MQ-NVMe/TCP;

FIG. 22 depicts an example embodiment of a Host to Controller Data (H2CData) PDU configured for use in MQ-NVMe/TCP;

FIG. 23 depicts an example embodiment of a Controller to Host Data (C2HData) PDU configured for use in MQ-NVMe/TCP;

FIG. 24 depicts an example embodiment of a Ready to Transfer (R2T) PDU configured for use in MQ-NVMe/TCP;

FIG. 25 depicts an example embodiment of a Disconnect Request SQE configured to support MQ-NVMe/TCP;

FIG. 26 depicts an example embodiment of a Disconnect Response CQE configured to support MQ-NVMe/TCP;

To facilitate understanding, identical reference numerals have been used herein, wherever possible, in order to designate identical elements that are common among the various figures.

DETAILED DESCRIPTION

Figure 1:
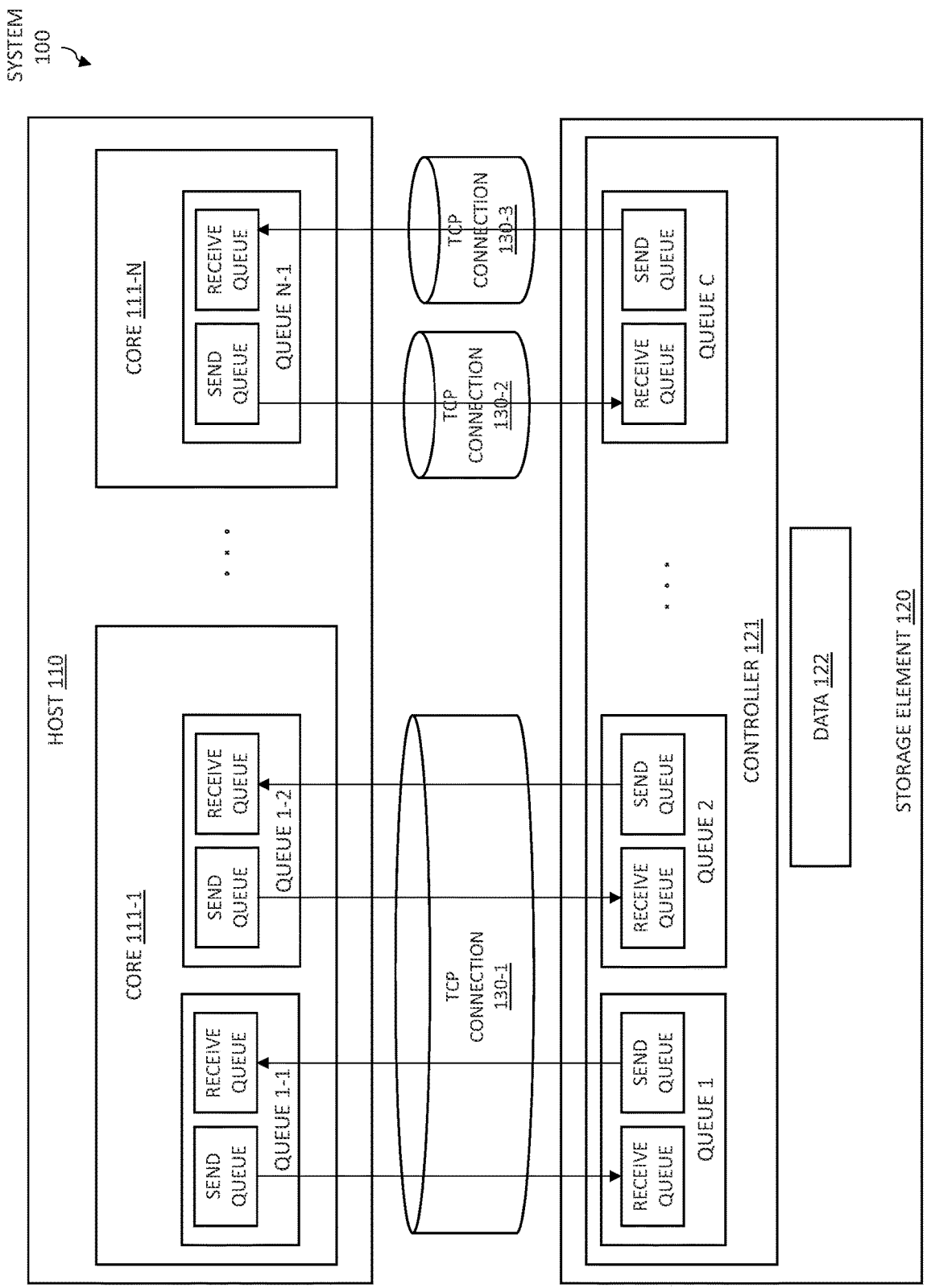
FIG. 1 depicts an example embodiment of a system configured to support communications for data storage.

Various example embodiments for supporting communications for data storage are presented herein. Various example embodiments for supporting communications for data storage may be configured to support communications between a host and a storage element for supporting storage of data in the storage element by the host (e.g., writing of data to the storage element by the host, reading of data from the storage element by the host, flushing of data from the storage element by the host, or the like, as well as various combinations thereof). Various example embodiments for supporting communications between a host and a storage element may be configured to support communications between the host (e.g., one or more cores of the host) and a controller of the storage element.

Various example embodiments for supporting communications between a host and a controller of a storage element may be configured to support, using a single transport layer connection, communications of multiple queue pairs supporting communications between the host and the controller of the storage element, where each of the queue pairs includes a queue on the host and a queue on the controller of the storage element. Various example embodiments for supporting communications between a host and a controller of a storage element may be configured to support, using a single transport layer connection, communications of multiple queue pairs supporting communications between the host and the controller of the storage element, where each queue pair includes a respective queue on the host that is composed of a pair of send and receive queues and a respective queue on the controller of the storage element that is composed of a pair of receive and send queues (e.g., the send queue on the host sends to the receive queue on the controller of the storage element and the send queue on the controller of the storage element sends to the receive queue on the host).

Various example embodiments for supporting communications between a host and a controller of a storage element may be configured to support, using multiple transport layer connections, communications of a single queue pair supporting communications between the host and the controller of the storage element. Various example embodiments for supporting communications between a host and a controller of a storage element may be configured to support, using multiple transport layer connections, communications of a single queue pair supporting communications between the host and the controller of the storage element, where the queue pair includes a queue on the host that is composed of a pair of send and receive queues and a queue on the controller of the storage element that is composed of a pair of receive and send queues (e.g., the send queue on the host sends to the receive queue on the controller of storage element and the send queue on the controller of the storage element sends to the receive queue on the host).

It will be appreciated that, in at least some such example embodiments, communications between the host and the storage element may be supported between various types of hosts (e.g., end user devices or portions thereof, network devices or portions thereof, or the like) and various types of storage elements (e.g., non-volatile storage elements such as flash memory, read-only memory, solid state drives (SSDs), or the like).

It will be appreciated that, in at least some such example embodiments, communications between the host and the storage element may be based on modification of one or more existing communication specifications or protocols suitable for supporting communications between a host and a controller of a storage element (e.g., based on modification of a storage access and transport protocol such as a Non-Volatile Memory express (NVMe) over Fabrics (NVMe-oF) protocol or other suitable type of storage access and transport protocol), based on one or more new communication specifications or protocols suitable for supporting communications between a host and a controller of a storage element, or the like, as well as various combinations thereof.

It will be appreciated that, although primarily presented herein with respect to use of specific types of hosts, storage elements, and communication specifications or protocols, various example embodiments for supporting communications for data storage may be supported for various other types of hosts, various other types of storage elements, various other types of communication specifications or protocols, or the like, as well as various combinations thereof.

It will be appreciated that these and various other example embodiments and advantages or potential advantages of supporting communications for data storage may be further understood by way of reference to the various figures, which are discussed further below.

FIG. 1 depicts an example embodiment of a system configured to support communications for data storage.

In FIG. 1, the system 100 includes a host 110 and a storage element 120. The host 110 may write data to the storage element 120 and read data from the storage element 120.

The host 110 includes a set of cores 111-1-111-N (collectively, cores 111). The cores 111 may be associated with one or more processors of the host 110 (which are omitted for purposes of clarity). The cores 111 of the host 110 may be configured to run software which may rely on storage of data in the storage element 120, including writing of data to the storage element 120 and reading of data from the storage element 120. The host 110 may include any type of host which may write data to the storage element 120 and read data from the storage element 120. For example, the host 110 may be an end device, such as an end user device (e.g., a smartphone, a desktop computer, a laptop computer, a tablet computer, or the like), an automated end device (e.g., an Internet-of-Things device), or the like. For example, the host 110 may be a network device, such as a router, switch, or the like. It will be appreciated that the host 110 may include various other types of elements which may write data to and read data from storage such as storage element 120.

The storage element 120 includes a controller 121 and stores data 122. The controller 121 is configured to control storage of the data 122, including writing the data 122 based on requests from the host 110 and reading the data 122 based on requests from the host 110. The data 122 stored on the storage element 120 may be stored for use by the host 110 (e.g., data 122 may be written to the storage element 120 by the host 110 and read from the storage element 120 by the host 110). The storage of the data 122 on the storage element 120 may be controlled by the controller 121 based on interaction by the controller 121 with the host 110. The storage element 120 may include any type of storage element 120 which may store data for use by the host 110. For example, storage element 120 may be a non-volatile memory (NVM), which also may be referred to as a non-volatile storage element or a persistent memory or persistent storage element, configured to retain stored information even after power is removed and without a need for constant power. For example, in the case of NVM, the storage element 120 may be flash memory, read-only memory (ROM), ferroelectric RAM, magnetic computer storage devices (e.g., hard disk drives (HDDs), optical discs, or the like, as well as various combinations thereof. For example, in the case of NVM, storage element 120 may include storage in semiconductor memory chips (e.g., storing data based on floating-gate memory cells such as floating-gate metal-oxide-semiconductor field-effect transistors (MOSFETs)), such as flash memory storage (e.g., NAND flash, solid state drives (SSDs), or the like), ROM chips such as erasable programmable ROM (EPROM), electronically erasable programmable ROM (EEPROM), or the like, as well as various combinations thereof. It will be appreciated that the storage element 120 may include various other types of storage elements.

The communication between the host 110 and the storage element 120 for supporting storage of the data 122 on the storage element 120, including writing of the data 122 to the storage element 120 and reading of the data 122 from the storage element 120, may be based on use of queues. The communication between the host 110 and the storage element 120 for supporting storage of the data 122 on the storage element 120 may be based on queue pairs where each queue pair includes a queue on the host 110 (illustratively, on one of the cores 111 of the host 110) and an associated queue on the storage element 120 (illustratively, on the controller 121 of the storage element 120). The communication between the host 110 and the storage element 120 for supporting storage of the data 122 on the storage element 120 may be based on pairs of queues including a queue on the host 110 and an associated queue on the controller 121 of the storage element 120, where the queue on the host 110 includes a pair of queues including a send queue and a receive queue and the queue on the controller 121 of the storage element 120 includes a pair of queues including a receive queue and a send queue, and where the send queue on the host 110 and the receive queue on the controller 121 of the storage element 120 support communications from the host 110 to the storage element 120 (e.g., communicating WRITE commands for writing data 122 to the storage element 120, communicating data being written to the storage element 120, communicating READ commands for requesting data 122 from the storage element 120, and so forth) and the send queue on the controller 121 of the storage element 120 and the receive queue on the host 110 support communications from the storage element 120 to the host 110 (e.g., communicating responses to commands such as WRITE commands for writing data 122 to the storage element 120 and READ commands for reading data 122 from the storage element 120, communicating data being read from the storage element 120, and so forth).

The communication between the host 110 and the storage element 120 for supporting storage of the data 122 on the storage element 120, including writing of the data 122 to the storage element 120 and reading of the data 122 from the storage element 120, may be based on use of transport layer connections. The communication between the host 110 and the storage element 120 for supporting storage of the data 122 on the storage element 120 may be based on queue pairs where each queue pair includes a queue on the host 110 (illustratively, on one of the cores 111 of the host 110) and an associated queue on the storage element 120 (illustratively, on the controller 121 of the storage element 120) and where communication between the queues in the queue pair is based on a transport layer connection. As discussed further hereinbelow, communication between queue pairs of the host 110 and the storage element 120 based on transport layer connections may be supported using a number of communication modes which may be represented as N:M communications (e.g., a 1:1 communication mode in which each queue pair of the host 110 and the storage element 120 is supported by a dedicated transport layer connection, an N:1 communication mode in which multiple queue pairs of the host 110 and storage element 120 (where the queues on the host 110 may be on the same core 111 of the host 110 or split across different cores 111 of the host 110) are supported by a single transport layer connection, a 1:N communication mode in which a single queue pair of the host 110 and the storage element 120 is supported by multiple transport layer connections, an N:M communication mode in which multiple queue pairs of the host 110 and storage element 120 are supported by multiple transport layer connections, or the like). The transport layer connections may be based on one or more transport layer protocols. For example, the transport layer connections may include Transmission Control Protocol (TCP) connections, a Multipath—TCP (MP-TCP) connections, Stream Control Transmission Protocol (SCTP) connections, QUIC (not an acronym) connections, or the like, as well as various combinations thereof. It is noted that, since MP-TPC, SCTP, and QUIC are multi-stream transport layer protocols (meaning that a single transport layer connection may be composed of independent delivery streams and mechanisms such as flow control, congestion control, reliable delivery, and so forth are independently implemented in each delivery stream), in such protocols the queue pair between the host 110 and controller 121 may be 1:1 mapped to a stream within a transport layer connection.

The communication between the host 110 and the controller 121 of the storage element 120 for supporting storage of the data 122 on the storage element 120 based on use of transport layer connections, as indicated above, may be configured to support communications of multiple queue pairs for a core of a host using a single transport layer connection. This is illustrated with respect to the core 111-1 of the host 110. As illustrated in FIG. 1, the core 111-1 of the host 110 includes two queues (denoted as Queue 1-1 and Queue 1-2) configured to communicate with two queues on the controller 121 of the storage element 121 (denoted as Queue 1 and Queue 2), respectively. More specifically, the queue pairs are communicatively connected as follows: (1) for the first queue pair including the Queue 1-1 on the core 111-1 of the host 110 and the Queue 1 on the controller 121 of the storage element 120, a Send Queue of Queue 1-1 on the core 111-1 of the host 110 sends to a Receive Queue of the Queue 1 on the controller 121 and a Send Queue of the Queue 1 on the controller 121 sends to a Receive Queue of Queue 1-1 on the core 111-1 of the host 110 and (2) for the second queue pair including the Queue 1-2 on the core 111-1 of the host 110 and the Queue 2 on the controller 121 of the storage element 120, a Send Queue of Queue 1-2 on the core 111-1 of the host 110 sends to a Receive Queue of the Queue 2 on the controller 121 and a Send Queue of the Queue 2 on the controller 121 sends to a Receive Queue of Queue 1-2 of the core 111-1 on the host 110. As illustrated in FIG. 1, the communications of the two queue pairs are supported using a single TCP connection 130-1. It will be appreciated that, although primarily presented with respect to an example embodiment in which the multiple queue pairs sharing the single TCP connection are on a common core of the host, the multiple queues that share the TCP connection may be spread across multiple cores of the host. It will be appreciated that, although primarily presented with respect to an example embodiment in which two queue pairs associated with a core of a host are supported by a single TCP connection, more than two queue pairs associated with a core of a host may be supported by a single TCP connection.

The communication between the host 110 and the controller 121 of the storage element 120 for supporting storage of the data 122 on the storage element 120 based on use of transport layer connections, as indicated above, may be configured to support communications of one queue pair for a core of a host using multiple transport layer connection. This is illustrated with respect to the core 111-N of the host 110. As illustrated in FIG. 1, the core 111-N of the host 110 includes one queue (denoted as Queue N-1) configured to communicate with a queue of the controller 121 of the storage element 121 (denoted as Queue C). More specifically, the queue pair is communicatively connected as follows: a Send Queue of Queue N-1 on the core 111-N of the host 110 sends to a Receive Queue of the Queue C on the controller 121 and a Send Queue of the Queue C on the controller 121 sends to a Receive Queue of Queue N-1 on the core 111-N of the host 110. As illustrated in FIG. 1, the communications of the queue pair are supported using two TCP connections including TCP connection 130-2 and TCP connection 130-3. It will be appreciated that the two TCP connections may be used to handle the two directions of transmission for the Send/Receive Queues (e.g., a first TCP connection being used for communications from the Send Queue of Queue N-1 on the core 111-N of the host 110 to the Receive Queue of the Queue C on the controller 121 and a second TCP connection being used for communications from the Send Queue of the Queue C on the controller 121 to the Receive Queue of Queue N-1 of the core 111-N on the host 110). It will be appreciated that, although primarily presented with respect to an example embodiment in which a single queue pair associated with a core of a host is supported by two TCP connections, more than two TCP connections may be used to support a queue pair associated with a core of a host.

It will be appreciated that, in at least some example embodiments, although omitted from FIG. 1 for purposes of clarity, a host may have N queues and P connections, one connection for each level of priority. So, a given connection carries messages for a specific priority, e.g., connection 1 carries all traffic for priority 1, connection 2 carries all traffic for priority 2, and so forth. In this arrangement, each of the N queues would post their respective priority 1 messages on connection 1, post their priority 2 messages on connection 2, and so forth. It also means priority X traffic from a queue has no ordering dependency with priority Y traffic, otherwise a queue cannot spread traffic across multiple connections. So, in this case, a connection is N:1 for all queues, but a queue is also 1:M mapped to connections.

It will be appreciated, as indicated above, that support for such example embodiments may be extended or generalized to supporting communications of N queue pairs based on M transport layer connections, where M may be less than N (in which case at least one of the transport layer connections supports communications of multiple queue pairs) or may be equal to N (in which case each transport layer connection supports communications of a single queue pair). It is noted that such embodiments may fork into two possibilities as follows: (1) each queue pair is 1:1 mapped to one transport layer connection and (2) there is at least one queue pair that is 1:M mapped to all transport layer connections).

The communication between the host 110 and the storage element 120, for supporting writing of data by the host 110 to the storage element 120 and reading of data by the host 110 from the storage element 120, may be based on a data storage communication specification or protocol. The communication between the host 110 and the storage element 120, for supporting writing of data by the host 110 to the storage element 120 and reading of data by the host 110 from the storage element 120, may be based on use of a storage access and transport protocol (e.g., using a modified version of NVMe-oF, using a new storage access and transport protocol, or the like, as well as various combinations thereof). For example, when communication between the host 110 and the storage element 120 is based on NVMe-oF, the Send Queues may be Submission Queues (SQs) and the Receive Queues may be Completion Queues (CQs). It will be appreciated that, although primarily presented herein within the context of using a modified version of NVMe-oF, referred to herein as multi-queue NVMe (MQ-NVMe), to support communications between the host 110 and the storage element 120 for controlling writing of data to the storage element 120 by the host 110 and reading of data from the storage element 120 by the host 110, communications between the host 110 and the storage element 120 for controlling writing of data to the storage element 120 by the host 110 and reading of data from the storage element 120 by the host 110 may be supported using various other data storage communication specifications or protocols (e.g., versions of NVMe-oF modified in other ways, other types of data storage communication specifications or protocols, or the like, as well as various combinations thereof It will be appreciated that various example embodiments presented herein for supporting NVMe-oF-based communications between the host 110 and the storage element 120 based on use of TCP connections may be further understood by first considering various aspects of NVMe and NVMe-oF, which are discussed further below. NVMe is a storage access and transport protocol for non-volatile memory (NVM) subsystem, such as NAND flash and next generation solid state drives (SSDs) for both consumers and enterprises. NVMe delivers the highest throughput and fastest response times for all types of enterprise grade workloads on a NVM subsystem. Herein, the terminology "NVMe devices" or "NVMe SSDs" or "NVMe Storage" may be used to refer to a NVM subsystem that uses NVMe as the storage access and transport protocol.

Early flash storage devices were connected via SATA or SAS—protocols developed decades ago for hard disk drives (HDDs) and are still widely used for data infrastructure. SATA and SAS connected flash storage provided huge performance gains over HDDs. Yet, as speeds increased—on CPUs, backplanes, DRAM, and networks—the SATA and SAS protocols began to limit the performance from flash devices. SATA and SAS protocols accounted for HDD characteristics, such as rotational delay, head seek times, etc., which add unnecessary complexity for NVM since NVM does not have such characteristics. In order to take full advantage of NVM performance, the NVMe protocol was created.

As the name implies, NVMe was designed assuming NVM such as flash memory, not disk, was the storage target. As a result, it was developed as a much more efficient (faster) protocol. To help deliver a high-bandwidth, low latency user experience, the NVMe protocol accesses NVM via a PCI Express (PCIe) bus with very high parallelism to reduce latency and increase bandwidth. NVMe supports up to 64K (65535) parallel command queues with up to 64K commands per queue. (NVMe is a command-response based protocol for reading and writing blocks of data to/from a storage). Thus, NVMe is much faster than SATA and SAS based hard disks and traditional all-flash architectures, which generally are limited to a single command queue with up to 32 commands per queue in SATA and 256 commands per queue in SAS. Conceptually, NVMe is a divided 12-lane highway versus the two-lane country road of the past (i.e., SAS and SATA).

The NVMe interface between the host and the storage device is based on a series of paired Submission and Completion Queues that are built by the driver (i.e., device driver for the storage device running on the host) and shared between the driver and the NVMe controller located in the storage device. A Submission Queue Entry (SQE) is a command from the host to the controller. A Completion Queue Entry (CQE) is a response from the controller to the host indication completion of execution of a command from host. The SQs and CQs may be used for various purposes, such as administration (Admin), input-output (I/O), or the like. It will be appreciated that, herein, irrespective of whether an SQ is an Admin SQ or an I/O SQ, each pair of SQ and CQ is collectively referred to as a Queue. The Queues can be located either in traditional host shared memory or in memory provided by the storage device. Once a pair of Queues is configured, the Queues may be used for almost all communications between the driver and the controller. A description of this communication process follows:

1. The driver enqueues each new command to the controller into the SQ. The format of the SQ itself is designed for maximum speed and efficiency. SQs include fixed-sized, 64 byte, entries. Each SQE describes one operation to be performed by the device such as a Read, Write, or Flush. Additionally, an SQE specifies the location in the device to read/write (e.g., a pointer in the host memory for the data to be written on a Write command, the location to place the data on a Read command, and so forth). The 64 byte SQE itself has enough information in it to describe a Read or Write operation of up to 8K bytes of data. Transfers up to 2MB can be accommodated by setting-up a single, additional 4K table entry.

2. When new entries are placed on an SQ, the driver informs the controller about the new entries by writing the new tail pointer to the SQ specific hardware doorbell register in the controller. This register is specific to the SQ being updated.

3. The controller fetches the commands sequentially from the SQ, from head pointer until the tail pointer.

4. The controller processes a command fetched from the SQ. For a read operation, the controller reads out the data from the specified location in the device and puts the data into the specified data pointer in host memory. For a write operation, the controller reads the data from the specified data pointer in host memory and puts the data into the specified location in device memory.

5. When the controller completes a command, it puts an entry on the CQ. CQs are similarly efficient. CQ entries are also fixed size, but only 16 bytes each. Each CQE includes completion status information and has a reference to the SQE for the operation that was completed. Thus, it is relatively straight-forward to correlate a given CQE with its original command.

6. After putting an entry into the CQ, the controller generates an interrupt to the driver of the host.

7. After receiving the interrupt, the driver of the host processes CQ entries from the controller.

8. After processing a group of CQ entries, the driver of the host signals this to the device by writing the updated head pointer of the CQ to the CQ specific hardware doorbell register.

There are separate Queues for Administration operations (such as creating and deleting Queues or updating firmware on the device) and for ordinary I/O operations (such as Read and Write). This ensures that I/O operations do not get "stuck" behind long-running Admin activities. The NVMe specification allows up to 64K individual queues, and each queue can have as many as 64K entries. Most devices don't allow this many, but the NVMe specification requires NVMe devices to support at least 64 queues (one Admin Queue and 63 I/O Queues) for server systems and at least 4 queues (one Admin Queue and 3 I/O Queues) for client systems.

NVMe allows many entries per I/O SQ. The advantage of allowing many entries per I/O SQ is the ability to start many I/O operations simultaneously, thereby allowing the device to stay busy and schedule its work in the most efficient way possible. This maximizes device throughput. On multiprocessor systems, the ability to have multiple queues permits having one Queue per processor (core). Having a Queue that is unique to each core allows the driver to process I/O initiations and completions without having to worry about contention from other processors and, thus, allows these actions to be performed almost entirely without acquiring and holding any locks (for mutual exclusion). For example, server processors with 100 cores are becoming common in high performance computing. In the near future, processor system could contain 500 cores.

NVMe also allows the driver to create multiple Queues per core and to establish different priorities among those Queues. While Queues are ordinarily serviced in a round robin manner, NVMe optionally supports a weighted round robin scheme that allows certain Queues to be serviced more frequently than others. For example, an application running in a core could be a database, wherein certain database operations are higher priority (requiring lower latency) than the others and multiple priority-based Queues may be used to handle the different types of operations. If a high performance server with 500 cores creates 10 priority-based Queues per core, this would result in the creation of 5000 Queues with the controller.

NVMe may be configured to support a pool of NVMe devices shared by multiple servers over a PCIe based fabric. In general, PCIe fabric cannot be extended beyond certain distances and it limits the number of computing systems that can share the storage. So scalability is a key challenge in NVMe over shared PCIe fabric.

It will be appreciated that the NVMe specification takes advantage of nonvolatile memory in all kinds of computing environments and, further, is future-proof in the sense that it is extendable to work with existing persistent memory technologies as well as various persistent memory technologies which may be developed in the future.

NVMe-oF defines extensions to NVMe that enable operation over a fabric other than PCIe, such as over legacy Ethernet networks, to create a very high performance storage network. As a result, NVMe storage devices can be shared among a large number of servers without any limitations on the size of the network.

As described above, the NVMe Multi-Queuing Model implements up to 64 k I/O Queues as well as an Admin Queues within each NVMe controller. For a PCIe attached NVMe controller, these Queues are implemented in host memory and shared by both the host CPUs and NVMe Controller. I/O is submitted to an NVMe device when a device driver writes a command to an I/O SQ and then writing to a doorbell register to notify the device. When the command has been completed, the device writes to an I/O CQ and generates an interrupt to notify the device driver.

NVMe-oF extends this design, so Queues in host memory are duplicated in the remote controller and a host-based Queue is 1:1 mapped to a controller-based Queue. The Queue on the host and the Queue on the controller communicate with each other across the fabric using a message based protocol. NVMe-oF defines Command and Response Capsules that are used by Queues to communicate across the fabric, as well as the methods for transport of Data. NVMe-oF deprecates certain NVMe commands that are not applicable to fabric based operations and introduces some additional fabric specific commands.

NVMe was designed to run over PCIe, wherein PCIe is an error free and lossless media, so NVMe-oF Capsules and Data generally demand equivalent reliability from the underlying fabric. An NVMe transport layer is layered on top of the fabric, wherein the transport layer provides reliable delivery of NVMe-oF command capsules and data between the host and the remote controller. The reliable transport layer is independent of the fabric physical interconnect and low level fabric protocol layers.

NVMe-oF on Ethernet fabric uses TCP as the reliable transport layer to transport NVMe capsules. The solution is known as NVMe/TCP, which has been added to the NVMe-oF specification. NVMe/TCP defines how the Capsules and Data are encapsulated within a TCP PDU (Protocol Data Unit). TCP port number 4420 has been assigned for transport of NVMe over TCP connection. Each host-based Queue and its associated controller-based Queue maps to its own TCP connection and can be assigned to a separate CPU core. For example, a TCP/IP network may be used to connect a set of application servers including CPUs to a set of storage elements including NVMe SSDs based on NVMe/TCP capabilities on the application servers and NVMe/TCP capabilities on the storage elements and associated NVMe/TCP connections over the TCP/IP network.

Figure 2:
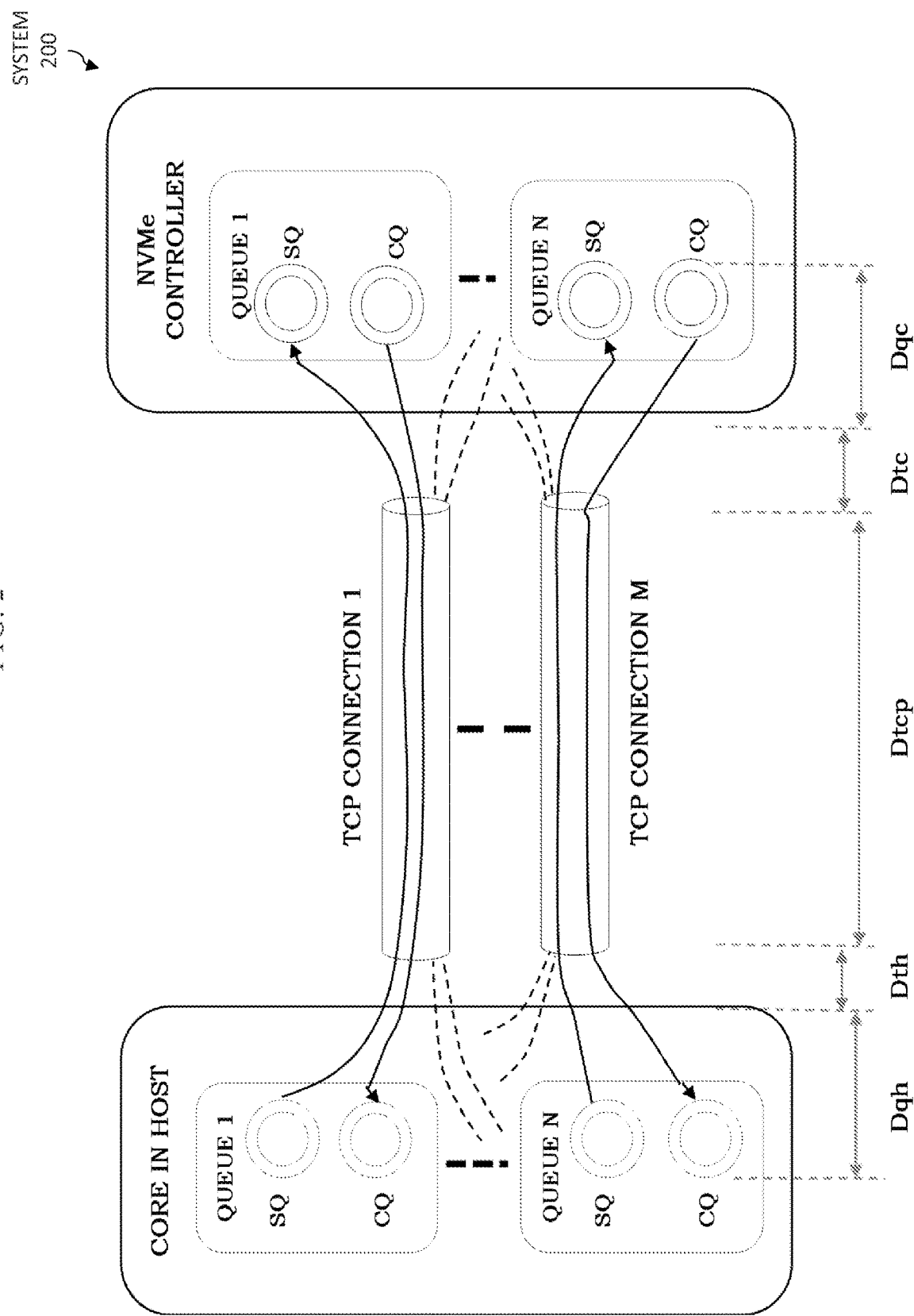
FIG. 2 depicts an example embodiment a system configured to support communications for data storage based on Multi-Queue Non-Volatile Memory express/Transmission Control Protocol (MQ-NVMe/TCP)

Various example embodiments may be configured to support a technique by which multiple Queues in a core (e.g., priority-based Queues) of the host can be multiplexed into a single TCP connection. It will be appreciated that, since such Queues belong to the same processor core, the Queues do not interlock on the shared TCP connection. It is noted that the technique can be generalized as N number of Queues in a core mapping to M number of TCP connections wherein N>M, which is illustrated in FIG. 2. As indicated herein, this approach may be referred to herein as "MQ-NVMe/TCP", which means Multi-Queue NVMe/TCP, and N/M is may be referred to as the "Multiplexing Factor".

FIG. 2 depicts an example embodiment a system configured to support communications for data storage.

In FIG. 2, the system 200 includes a core of a host and an NVMe controller. The core of the host and the NVMe controller support MQ-NVMe/TCP with N Queues being supported using M TCP connections. For example, if there are 10 Queues per core, and 10 associated Queues on the NVMe controller, then all 10 Queues can be multiplexed into a single TCP connection (e.g., M=1). For example, if there are 10 Queues per core, the core can distribute the Queues among two TCP connections (e.g., M=2), such as Queues 1-5 are multiplexed on TCP connection 1 and Queues 6-10 are multiplexed on TCP connection 2. It will be appreciated that various other values of N and M may be supported for supporting communications between the core of the host and the NVMe controller. It is noted that, since multiple Queues are multiplexed on a single TCP connection, the Queues in the group for the TCP connection may suffer from head-of-line (HOL) blocking; however, it may be shown that the degree of such HOL blocking may be negligible compared to the performance gain on minimizing the number of TCP connections at the NVMe controller. The proof requires analysis of the time taken at various stages during the flight of a SQE or CQE between a host and the controller, which is discussed further below.

In FIG. 2, the time T taken by an SQE or an CQE exchanged between the host and NVMe controller can be isolated into the following stages: (1) Dqh, which is the time an SQE waits in host before being transmitted as a PDU on the TCP connection or the time a CQE waits in the host before being processed by host, (2) Dth, which is the time a PDU waits in the receive buffer (in the host) of the TCP connection and before getting enqueued to CQ or its data copied to host memory (for C2HData PDUs) or the time a PDU waits in the transmit buffer (in the host) of the TCP connection before the PDU is actually dispatched in a TCP message, (3) Dtcp, which is the time a PDU takes to travel over a TCP connection between the host and the NVMe controller, (4) Dtc, which is the time a PDU waits in the receive buffer (in the NVMe controller) of the TCP connection and before getting enqueued to SQ or its data is stored into NVM (for H2CData PDUs) or the time a PDU waits in the transmit buffer (in the NVMe controller) of the TCP connection before the PDU is actually dispatched in a TCP message, and (5) Dqc, which is the time a CQE waits in the NVMe controller before being transmitted on the TCP connection or the time an SQE waits in the NVMe controller before being processed by the NVMe controller. So, T=Dqh+Dth+Dtcp+Dtc+Dqc, which is illustrated in FIG. 2. Additionally, assume that Dtcp-all=Dth+Dtcp+Dtc, i.e., the overall time spent by a PDU on the TCP connection.

In FIG. 2, for purposes of comparison of the N:M case with the 1:1 case, assume that the time taken by a command in the 1:1 case is T1=Dqh1+Dtcp-all-1+Dqc1 and that the time taken by a command in the N:M case is T2=Dqh2+Dtcp-all-2+Dqc2. In FIG. 2, N numbers of Queues map to M numbers of TCP connections, i.e., higher priority queues may experience HOL blocking by lower priority queues. So it can be deduced, in theory that Dtcp-all-2=(N/M)×Dtcp-all-1. For example, when 10 priority queues map to a single TCP connection then Dtcp-all-2=10×Dtcp-all-1; however, that generally will not be the case because in the 1:1 case, both the NVMe controller and the host have to poll N/M times more TCP connections which weighs in Dth1 and Dtc1. So, Dtcp-all-2<=(N/M)×Dtcp-all-1. Further, Dqh1=Dqh2=Dqh and Dqc1=Dqc2=Dqc. Empirically, it may be seen that Dqh and Dqc are largely dependent on the depth of the CQ and SQ. NVMe supports up to 65535 commands per Queue. As the Queue depth increases, an increasing number of concurrent NAND Flash components are utilized, thus increasing the performance. However, this increase is not linear with Queue depth because random access will not distribute perfectly across the multiple dies in the SSD. As Queue depth increases, there are more cases of commands landing on the same Flash component. As a result, the performance asymptotically approaches the saturation as the Queue depth gets large. So, at larger Queue depths, Dqh1/Dqh2 and Dqc2/Dqc2 are the most prominent legs in the overall flight of a command between a host and the controller, i.e., Dqh+Dqc>Dtcp-all-2 >=Dtcp-all-1.

It is noted that Dtcp-all can be improved by deployment of Multi-Path TCP (MP-TCP) that enables load balancing of a TCP connection across multiple paths. Additionally, Data Center TCP extensions further improves the TCP acknowledgement mechanism which contributes to reduction of Dtcp-all. So, it can be deduced that T1=T2~Dqh+Dqc, i.e., in larger-sized Queues, multiplexing multiple Queues on a single TCP connection does not bring significant performance impact, provided N/M is within reasonable limits (e.g., 5, 10, 20, or the like) which may vary under various conditions.

It is noted that the various example embodiments of NVMe-oF may be implemented using a multi-streamed transport layer protocol such as MP-TCP, SCTP, or QUIC. NVMe-oF using MP-TCP may be defined as NVMe/MP-TCP, NVMe-oF using SCTP may be defined as NVMe/SCTP, and NVMe-oF using QUIC may be defined as NVMe/QUIC. In case of multi-streamed transport layer protocols, N queues may be N:1 mapped to a transport layer connection such that each queue is transported independently over a stream in the connection that is dedicated for the queue alone. In that case there is no HOL blocking among the queues.

Various example embodiments, as indicated hereinabove and discussed further below, may be configured to support MQ-NVMe/TCP which provides multiplexing of multiple NVMe Queues on a core on a single TCP connection. It is noted that, since multiple NVMe Queues on a core are multiplexed on a single TCP connection, Queue Identifiers (Queue-IDs) may be used to distinguish between communications of the multiple NVMe Queues on the core. It is noted that same would be the case in NVMe/MP-TCP, NVMe/SCTP, and NVMe/QUIC. The core, for each of its NVMe Queues, may assign a unique Queue-ID to the Queue and exchange the Queue-ID over the TCP connection to establish the Queue at the NVMe controller. For each of the Queues, once the Queue for the Queue-ID is created in both host and the controller, the host and the controller may exchange the command capsules or data for the Queue by encoding the Queue-ID in the corresponding NVMe/TCP PDUs. The core can dynamically establish or teardown a Queue over a TCP connection. As indicated hereinabove and discussed further below, the various functions of MQ-NVMe/TCP may be implemented as extensions to NVMe/TCP and the functions of MQ-NVMe/TCP may be backward compatible with NVMe/TCP so as to support seamless integration of MQ-NVMe/TCP with NVMe/TCP.

Figure 3:
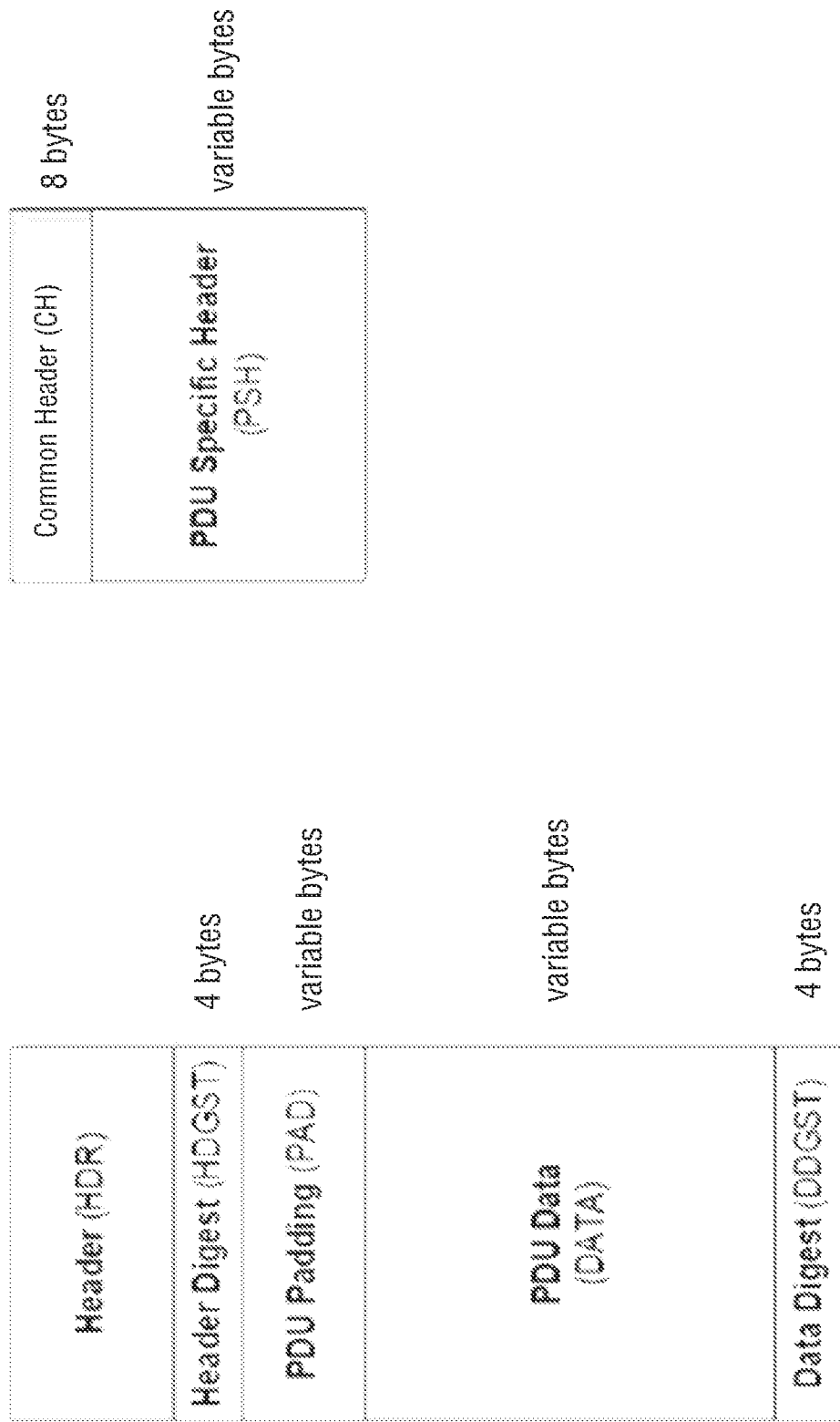
FIG. 3 depicts an example embodiment of a Protocol Data Unit (PDU) structure for MQ-NVMe/TCP.

In MQ-NVMe/TCP, a host and a controller may communicate over TCP by exchanging MQ-NVMe/TCP Protocol Data Units (PDUs). The MQ-NVMe/TCP PDUs may have the same PDU format as NVME/TCP PDUs, with a modified PDU common header. An example of an MQ-NVME/TCP PDU structure is presented in FIG. 3. The MQ-NVMe/TCP PDU may be used to transfer a Capsule, Data, or other control information. As depicted in FIG. 3, the MQ-NVMe/TCP PDU, like the NVMe/TCP PDU, includes five parts as follows: (1) PDU Header (HDR), (2) PDU Header Digest (HDGST), (3) PDU Padding field (PAD), (4) PDU Data field (DATA), and (5) Data Digest (DDGST). The PDU Header (HDR) is required in all PDUs, which is further composed of a PDU Common Header (CH) and a PDU specific Header (PSH). The PDU Header Digest (HDGST), the PDU Padding field (PAD), the PDU Data field (DATA), and the Data Digest (DDGST) field are included or omitted based on the PDU type and the values exchanged during connection establishment.

In MQ-NVMe/TCP, the PDU common header of NVMe/TCP may be extended to support MQ-NVMe/TCP. The extensions to the PDU common header of NVMe/TCP may be configured to support the following operations: (A) during connection set-up, a host or a controller will exchange whether it is MQ-NVMe/TCP capable and, based on the exchange, the host and the controller negotiate the MQ-NVMe/TCP capability of the connection (e.g., whether MQ-NVMe/TCP is used or whether NVMe/TCP is supported) and (B) use of Queue-IDs of the Queues in the PDUs for Queue-specific operations (which is unnecessary in NVMe/TCP since the connection and the Queue have a 1:1 binding and, thus, the identity of the Queue is implicit). An example of a PDU common header configured to support such operations is presented in FIG. 4.

In at least some example embodiments, in order to satisfy (A), the PDU common header may be configured to include an indication as to whether the element sending the PDU supports MQ-NVMe/TCP. For example, as depicted in the example PDU common header of FIG. 4, a "MQ_CAPABLE" bit may be defined in the Flags field in the PDU common header of FIG. 3 The MQ_CAPABLE bit stands for "Multi-Queue Capability". This bit may be used by the PDUs exchanged to set-up the MQ-NVMe/TCP Connection. When this bit is set to "1", then it means the sender of the PDU is MQ-NVMe/TCP capable (although it will be appreciated that a "0" also could be used for this purpose). It will be appreciated that the indication as to whether the element sending the PDU supports MQ-NVMe/TCP may be encoded within the PDU common header in other ways. It is noted that generic methods for use of the MQ_CAPABLE bit are presented with respect to FIG. 5, FIG. 6, and FIG. 7.

In at least some example embodiments, in order to satisfy (B), the PDU common header may be configured to include an indication as to whether the PDU including the PDU common header includes a Queue-ID. For example, as depicted in the example PDU common header of FIG. 4, a "QUEUE_ID_PRESENT" bit may be defined in the Flags field in the PDU common header of FIG. 3. The QUEUE_ID_PRESENT bit stands for "Queue-ID present". When this bit is set to 1, then it means that the PDU common header includes an additional 2-byte field, called the "Queue-ID" field, which encodes the Queue-ID of a Queue and which is used by PDUs involved in Queue specific operations. It is noted that generic methods for use of the QUEUE_ID_PRESENT bit and the optional Queue-ID field are presented with respect to FIG. 8 and FIG. 9.

It is noted that the PDU common header for MQ-TCP/NVMe is backward compatible with the existing PDU common header for NVMe/TCP since it shares the same format (e.g., the additional Queue-ID field is OPTIONAL, which is controlled by the QUEUE_ID_PRESENT bit in the Flags field such that this additional field can be omitted from the PDU common header in the case of NVMe/TCP).

FIG. 5 depicts an example embodiment of a method for use by an initiator of an NVMe/TCP connection to initiate the NVMe/TCP connection (e.g., a core of a host). The method 500 demonstrates the MQ-NVMe/TCP specific extensions on the PDU sent for initiating the NVMe/TCP connection. The method 500 starts at block 501 and proceeds to block 510. Block 510 performs existing processing for initiating a connection (e.g., building and encoding the PDU that carries the connection request) and the method 500 then proceeds to block 520. Block 520 checks if the sender is MQ-NVMe/TCP capable. If the sender is MQ-NVMe/TCP capable then the method 500 proceeds to block 530, otherwise the method 500 proceeds to block 540. Block 530 sets the MQ_CAPABLE bit in the PDU and the method 500 then proceeds to block 540. Block 540 sends the PDU over the TCP connection to the remote end (e.g., the NVMe controller). From block 540, the method 500 proceeds to block 599 where the method 500 ends.

Figure 6:
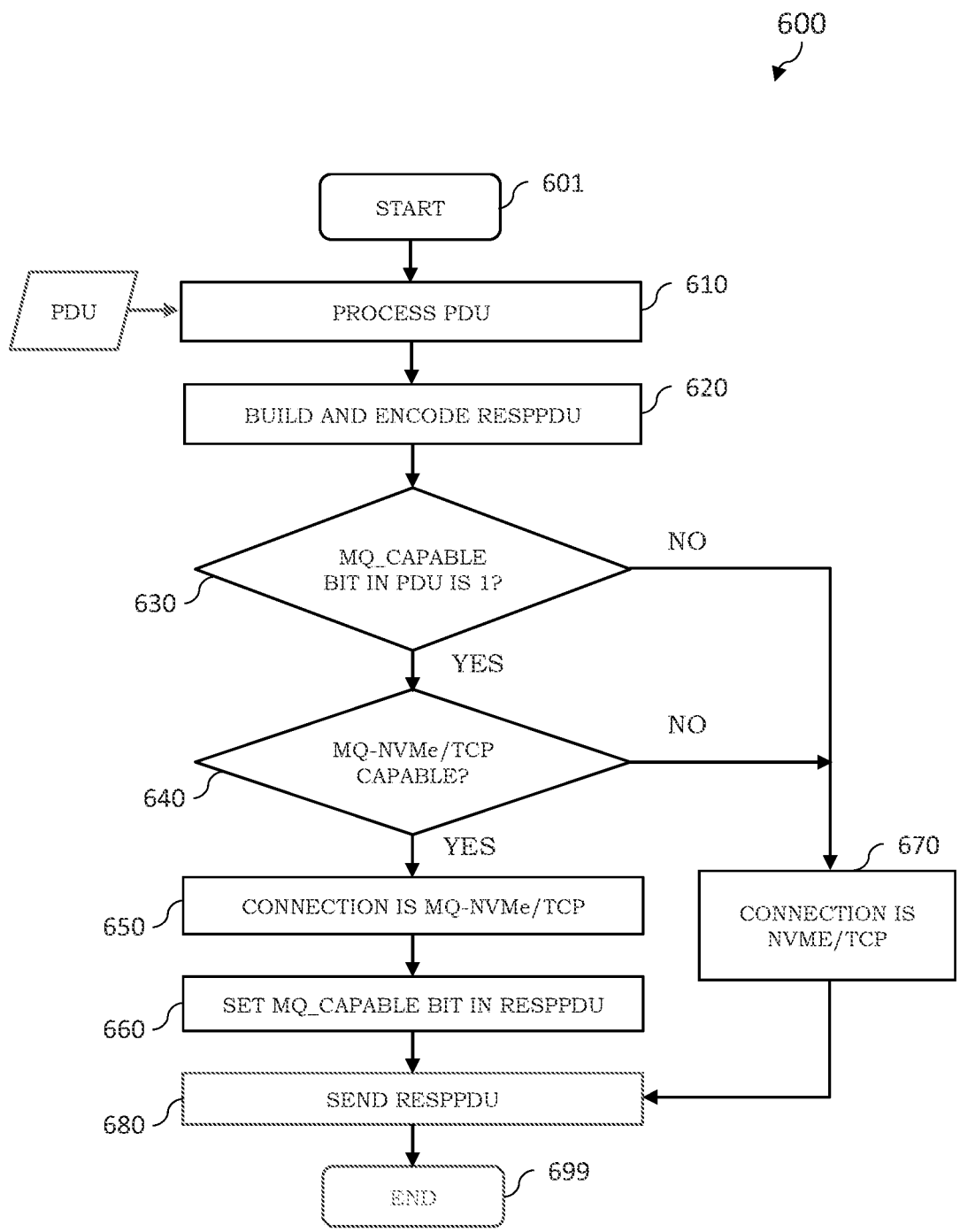
FIG. 6 depicts an example embodiment of a method for use by a receiver of a PDU that requests an NVMe/TCP connection.

FIG. 6 depicts an example embodiment of a method for use by a receiver of a PDU that requests an NVMe/TCP connection (e.g., the NVMe controller). The method 600 demonstrates the MQ-NVMe/TCP specific extensions on the PDUs exchanged for setting up the NVMe/TCP connection. The input to the method 600 is a PDU that requests an NVMe/TCP connection. The method 600 starts at block 601 and proceeds to block 610. Block 610 processes the PDU using existing methods, and the method 600 then proceeds to block 620. Block 620 builds and encodes the PDU to be sent as response (RespPDU) to the sender of the connection request, and the method 600 then proceeds to block 630. Block 630 checks if the sender is MQ-NVMe/TCP capable, i.e., if the MQ_CAPABLE bit is set to 1 in the received PDU. If the sender is MQ-NVMe/TCP capable (e.g., the MQ_CAPABLE bit is set to 1) then the method 600 proceeds to block 640, otherwise the method 600 proceeds to block 670. Block 640 checks if the receiver is MQ-NVMe/TCP capable. If the receiver is MQ-NVMe/TCP capable then the method 600 proceeds to block 650, otherwise the method 600 proceeds to block 670. Block 650 sets the connection as an MQ-NVMe/TCP connection, and the method 600 then proceeds to block 660. Block 670 sets the connection as an NVMe/TCP connection, and the method 600 then proceeds to block 680. Block 660 sets the MQ_CAPABLE bit in the RespPDU to 1 since the connection is MQ-NVMe/TCP, and the method 600 then proceeds to block 680. Block 680 sends the RespPDU over the TCP connection to the remote end. From block 680, the method 600 proceeds to block 699, where the method 600 ends.

Figure 7:
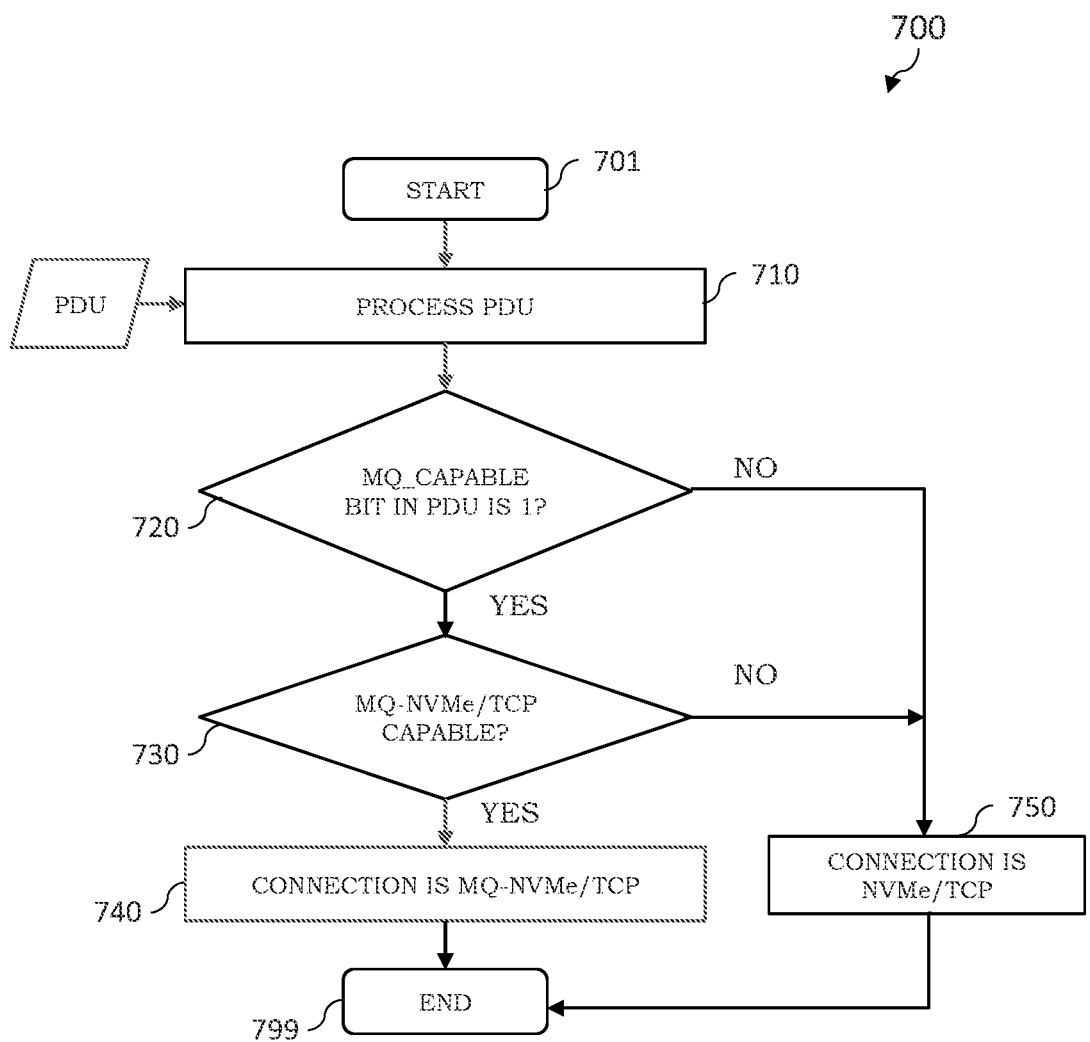
FIG. 7 depicts an example embodiment of a method for use by the initiator of the NVMe/TCP connection to process the response PDU from the remote end for the NVMe/TCP connection.

FIG. 7 depicts an example embodiment of a method for use by the initiator of the NVMe/TCP connection (e.g., the core of the host) to process the response PDU from the remote end NVMe/TCP connection. The input to the method 700 is the response PDU. The method 700 starts at block 701 and proceeds to block 710. Block 710 processes the PDU using existing methods, and the method 700 then proceeds to block 720. Block 720 checks if the remote end is MQ-NVMe/TCP capable, i.e., if MQ_CAPABLE bit in the PDU is set to 1. If the remote end is MQ-NVMe/TCP capable (e.g., the MQ_CAPABLE bit is set to 1) then the method 700 proceeds to block 730, otherwise the method 700 proceeds to block 750. Block 730 checks if the receiver is MQ-NVMe/TCP capable. If the receiver is MQ-NVMe/TCP capable then the method 700 proceeds to block 740, otherwise the method proceeds to block 750. Block 740 sets the connection as an MQ-NVMe/TCP connection as both the ends are capable of MQ-NVMe/TCP, and the method 700 then proceeds to block 799, where the method 700 ends. Block 750 sets the connection as an NVMe/TCP connection, and the method 700 then proceeds to block 799, where the method 700 ends.

Figure 8:
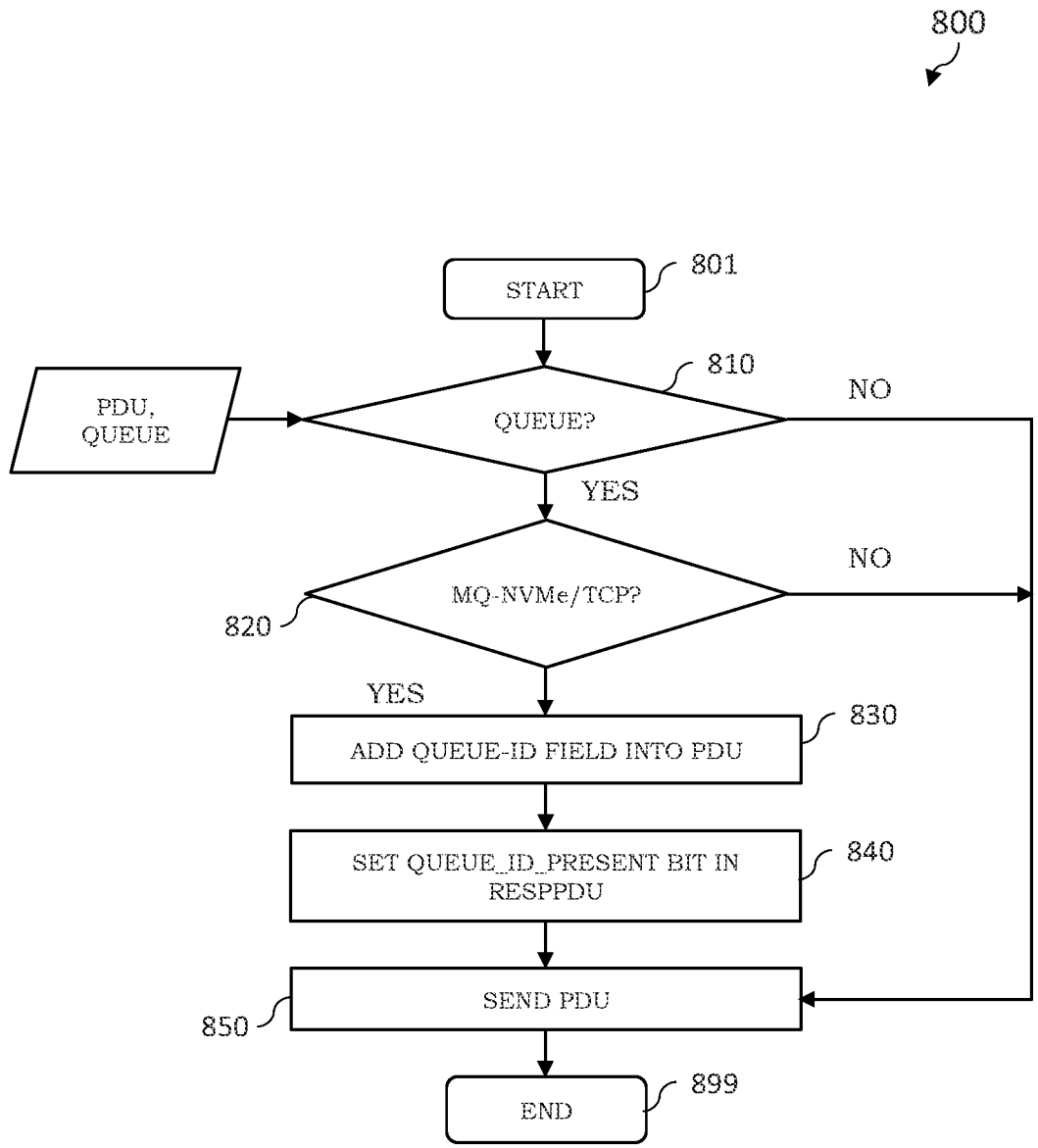
FIG. 8 depicts an example embodiment of a method for use by a sender of a PDU where the PDU performs a Queue-specific operation.

FIG. 8 depicts an example embodiment of a method for use by a sender (e.g., host or NVMe controller) of a PDU where the PDU performs a Queue-specific operation. The inputs to the method 800 include the PDU to be sent and the Queue if the PDU performs a Queue-specific operation (otherwise NULL). The method 800 begins at block 801 and proceeds to block 810. Block 810 checks if a Queue is provided in the input. If a Queue is not provided in the input then the method 800 proceeds to block 850, otherwise the method 800 proceeds to block 820. Block 820 checks if the connection is an MQ-NVMe/TCP connection. If the connection is not an MQ-NVMe/TCP connection the method 800 proceeds to block 850, otherwise the method 800 proceeds to block 830. Block 830 appends the optional Queue-ID into the PDU common header, and the method 800 then proceeds to block 840. Block 840 sets the QUEUE_ID_PRESENT bit in the Flags field in the PDU common header to 1, to indicate the presence of Queue-ID field, and the method 800 then proceeds to block 850. Block 850 sends the PDU over the TCP connection to the remote end and the method 800 then proceeds to block 899, where the method 800 ends.

Figure 9:
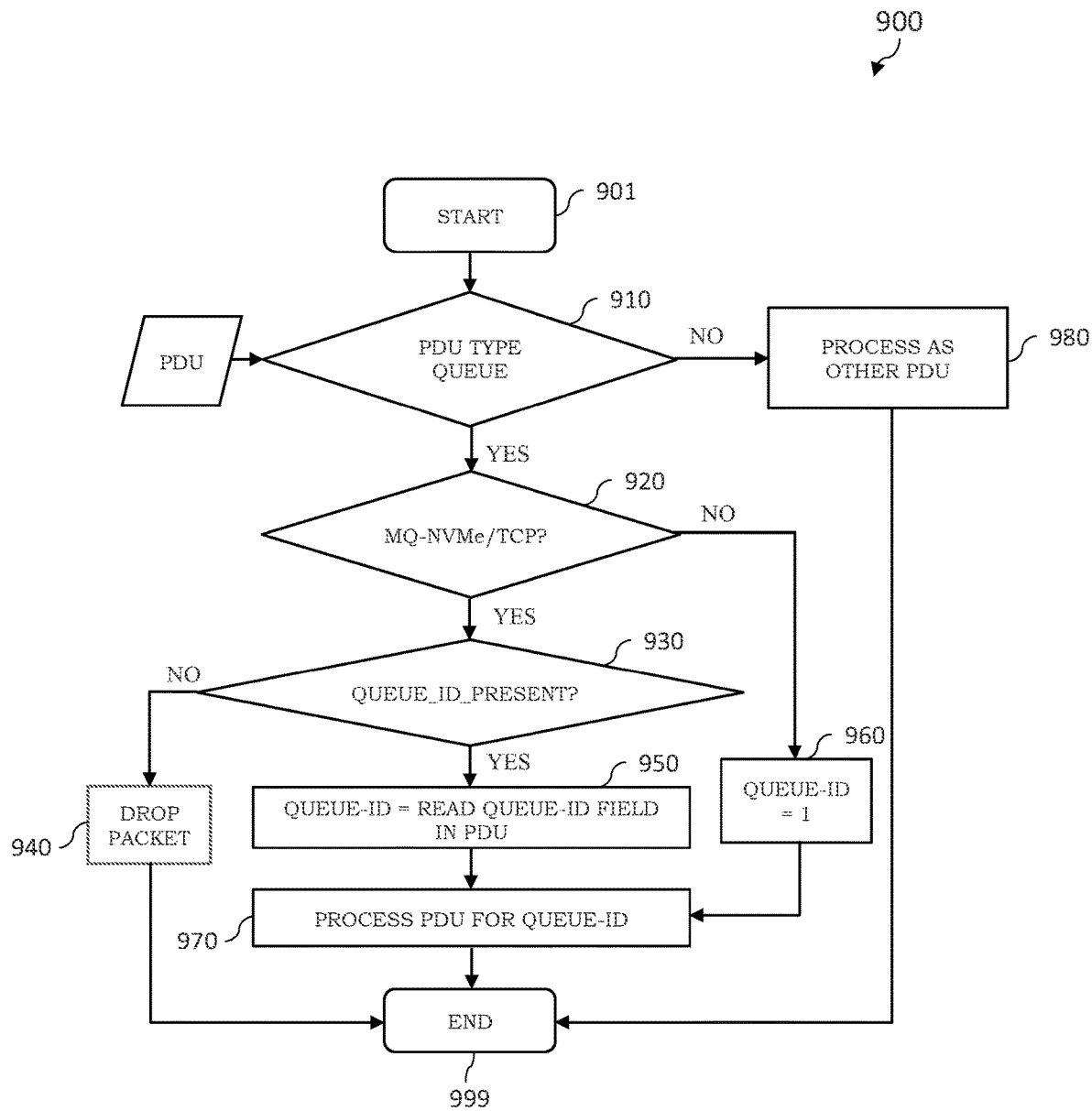
FIG. 9 depicts an example embodiment of a method for use by a receiver to process a PDU in the context of a Queue.

FIG. 9 depicts an example embodiment of a method for use by a receiver (e.g., a host or an NVMe controller) to process a PDU in the context of a Queue. The input to the method 900 is a received PDU. The method 900 starts at block 901 and proceeds to block 910. Block 910 checks if the PDU type is for a Queue specific operation. If the PDU type is not for Queue specific operation then the method 900 proceeds to block 980, otherwise the method 900 proceeds to block 920. Block 920 checks if the connection is an MQ-NVMe/TCP connection. If the connection is not an MQ-NVMe/TCP connection then the method 900 proceeds to block 960, otherwise the method 900 proceeds to block 930. Block 960 sets the Queue-ID to the default (=1) as there is only one Queue associated with a NVMe/TCP connection, and the method 900 then proceeds to block 930. Block 930 checks if the QUEUE_ID_PRESENT bit is set in the PDU. If the QUEUE_ID_PRESENT bit is not set in the PDU, then the method 900 proceeds to block 940, otherwise the method 900 proceeds to block 950. Block 940 drops the packet as, in a MQ-NVMe/TCP connection, a PDU for a Queue specific operation must include Queue-ID field in the PDU common header, and the method 900 then proceeds to block 999 where the method 900 ends. Block 950 parses the Queue-ID field from the PDU common header and the method 900 then proceeds to block 970. Block 970 processes the PDU for the Queue-ID, and the method 900 then proceeds to block 999 where the method 900 ends.

It is noted that the rules for encoding PDU common headers for the PDUs used in MQ-NVMe/TCP are discussed further below (with the definitions of the remaining parts of the PDUs (namely, PSH, HDGST, PAD, DATA, and DDGST) remaining unchanged from NVMe/TCP.

MQ-NVMe/TCP may be configured to support an Initialize Connection Request (ICReq), which is a PDU sent from a host to a controller to communicate NVMe/TCP connection parameters after establishment of an NVMe/TCP connection. The PDU-Type is 0x00. When a core in a host supports MQ-NVMe/TCP, it initiates an ICReq with the MQ_CAPABLE bit set to 1. When a core in a host does not support MQ-NVMe/TCP, it initiates the ICReq with MQ_CAPABLE bit set to 0 so that the PDU is no different from the format for TCP/NVMe. An example embodiment of an ICReq PDU configured to support MQ-NVMe/TCP is depicted in FIG. 10, denoted as ICReq PDU 1000. A host follows the method described in FIG. 5 for initiating an ICReq PDU.

MQ-NVMe/TCP may be configured to support an Initialize Connection Response (ICResp), which is a PDU sent from a controller to a host to communicate NVMe/TCP connection parameters after acceptance of a connection request (ICReq). The PDU-Type is 0x01. When a controller supports MQ-NVMe/TCP and receives the MQ_CAPABLE bit as '1' in the ICReq received from the host, it sends the ICResp with the MQ_CAPABLE bit set to 1, otherwise it sends the ICResp with the MQ_CAPABLE bit set to 0 so that the PDU is no different from the format for NVMe/TCP. An example embodiment of an ICResp PDU configured to support MQ-NVMe/TCP is depicted in FIG. 11, denoted as ICResp PDU 1100. A controller implements the method described in FIG. 6 for sending the ICResp PDU (it is the RespPDU in FIG. 6).

MQ-NVMe/TCP may be configured to support a Host to Controller Terminate Connection Request (H2CTermReq), which is a PDU sent from a host to a controller in response to a fatal transport error. The PDU-Type is 0x02. It will be appreciated that here, extensions are not needed since this PDU is not used for Queue specific operation but, rather, is used to terminate the connection. Accordingly, the format and procedures of H2CTermReq for NVMe/TCP may be reused for MQ-NVMe/TCP. An example embodiment of an H2CTermReq configured to support MQ-NVMe/TCP is depicted in FIGS. 12A and 12B, denoted as H2CTermReq PDU 1200.

MQ-NVMe/TCP may be configured to support a Controller to Host Terminate Connection Request (C2HTermReq), which is a PDU sent from a controller to a host in response to a fatal transport error. The PDU-Type is 0x03. It will be appreciated that here, extensions are not needed since this PDU is not used for Queue specific operation but, rather, is used to terminate the connection. Accordingly, the format and procedures of C2HTermReq for NVMe/TCP may be reused for MQ-NVMe/TCP. An example embodiment of a C2HTermReq configured to support MQ-NVMe/TCP is depicted in FIG. 13, denoted as C2HTermReq PDU.

MQ-NVMe/TCP may be configured to support a Command Capsule (CapsuleCmd), which is a PDU sent from a host to a controller to transfer an NVMe-oF Command Capsule. The Capsule carries a SQE from the host to controller, which is a command from the host to the controller. The PDU-Type is 0x04.

It is noted that none of the commands carried by the existing CapsuleCmd PDU (SQE in the PSH field of the CapsuleCmd PDU) indicates the Queue-ID of the Queue. The Queue specific commands can be I/O commands or fabric commands. The only exception is the Connect Request SQE, a fabric command that encodes the Queue-ID in bytes 42-43, which is depicted in FIGS. 14A and 14B (denoted as Connect Request SQE 1400).

In a MQ-NVMe/TCP connection, the CapsuleCmd needs to carry the identity of the Queue associated with the SQE. When a host sends a command in a MQ-NVMe/TCP connection, the CapsuleCmd PDU sets the QUEUE_ID_PRESENT bit to '1' and encodes the Queue-ID field in the PDU common header with the identity of the Queue (it is noted that this is merely marked generically within the CH PDU section to indicate that the Queue-ID field may be added to the CH in various ways, such as using the format depicted in FIG. 4). The PSH (bytes 08-71) encodes the SQE. An example embodiment of a CapsuleCmd PDU configured to support MQ-NVMe/TCP is depicted in FIG. 15 (denoted as CapsuleCmd PDU 1500). A host implements the method in FIG. 8 to send a CapsuleCmd PDU. A controller implements the method in FIG. 9 to process a CapsuleCmd PDU.

In a MQ-NVMe/TCP connection, the CapsuleCmd may be used for various types of commands. In general, an SQE is 64 bytes in size and may include one of the following classes of commands to be executed in the controller: (1) Admin Commands, (2) I/O Commands, and (3) Fabric Commands. Admin commands are used for various administrative functions between a host and a controller. I/O Commands are used for operations related to reading and writing of data between a host and a controller. The 64 bytes of an Admin or I/O command is structured as depicted in FIG. 16, which depicts the Command/SQE format for use in a CapsuleCmd PDU configured for use in MQ-NVMe/TCP (denoted as Command/SQE format 1600). The format of a Command Dword 0 is depicted in FIG. 17, which depicts the Command Dword 0 format for use in a Command/SQE format for use in a CapsuleCmd PDU configured for use in MQ-NVMe/TCP (denoted as Command Dword 0 Format 1700).

In a MQ-NVMe/TCP connection, as indicated above, the CapsuleCmd may be used for various types of commands. The Admin and I/O commands are defined by the base NVMe specification and only a few of them are currently used for NVMe/TCP. For example, the only two I/O commands currently used by NVMe/TCP are Read and Write Commands. Fabrics commands are specifically defined for NVMe-oF and are used to create queues and initialize a controller. Fabrics commands have an Opcode field of 7Fh.

The general format of an NVMe-oF Command SQE for a Fabrics command depicted in FIG. 18 (denoted as NVMe-oF Command SQE 1800). The Opcode (OPC) is set to 0x7f which indicates a Fabrics command. FCType encodes the exact Command. Bytes 40-63 encode the Fabrics command based for the FCType.

MQ-NVMe/TCP may be configured to support a Response Capsule (CapsuleResp), which is a PDU sent from a controller to a host to transfer an NVMe-oF response capsule. A CapsuleResp corresponds to a CapsuleCmd sent by the host to the controller. The CapsuleResp carries a CQE from the controller to the host. The PDU-Type is 0x05.

It is noted that none of the command responses carried by the existing CapsuleResp PDU (CQE in the PSH field of the CapsuleResp PDU) indicates the Queue-ID of the Queue. This includes the Connect Response CQE, which is depicted in FIG. 19 (denoted as Connect Response CQE 1900).

In a MQ-NVMe/TCP connection, the CapsuleResp needs to carry the identity of the Queue associated with the CQE. When a controller sends a response in a MQ-NVMe/TCP connection, in the CapsuleResp PDU, the controller sets the QUEUE_ID_PRESENT bit to '1' and encodes the Queue-ID field in the PDU common header with the identity of the Queue (it is noted that this is merely marked generically within the CH PDU section to indicate that the Queue-ID field may be added to the CH in various ways, such as using the format depicted in FIG. 4). An example embodiment of a CapsuleResp PDU configured to support MQ-NVMe/TCP is depicted in FIG. 20 (denoted as CapsuleResp PDU 2000). A controller implements the method in FIG. 8 to send a CapsuleResp PDU. A host implements the method in FIG. 9 to process a CapsuleResp PDU.

In a MQ-NVMe/TCP connection, as indicated above, fabrics commands are specifically defined for NVMe-oF and are used to create queues and initialize a controller. Fabrics commands have an Opcode field of 7Fh. The general format of an NVMe-oF Command Response CQE for a Fabrics command depicted in FIG. 21 (denoted as NVMe-oF Command Response CQE 2100). The Opcode (OPC) is set to 0x7f which indicates a Fabrics command. FCType encodes the exact Command. The NVMe-oF Command Response CQE 2100 may encoded in the bytes 08-23 of the CapsuleResp PDU 2000 of FIG. 20. It is noted that, irrespective of the response type, the mandatory fields are SQHD and CID. When the host receives the CQE, the host identifies the SQE based on the CID.

MQ-NVMe/TCP may be configured to support a Host to Controller Data (H2CData) PDU. H2CData PDU is used to transfer data from the host to the controller (e.g., the data written by the host to the storage element). H2CData PDU corresponds to a WRITE command sent earlier by host to the controller. In a host, a command is uniquely identified by {Queue-ID, Command Identifier (CID)}. CID is unique only with respect to a Queue. The H2CData PDU carries the CCCID field (bytes 08-09) that encodes the CID of the WRITE command (SQE) that initiated the data transfer from host to controller. In NVMe/TCP, the H2CData PDU does not carry any explicit Queue-ID of the Queue, since the Queue-ID is implicit due to the 1:1 binding of the Queue to the TCP connection. In a MQ-NVMe/TCP connection, data can be transferred from host to controller for multiple Queues and, thus, the H2CDataPDU needs to also carry the Queue-ID associated with the WRITE command. The host sets the QUEUE_ID_PRESENT bit to '1' and encodes the Queue-ID field in the PDU common header of the H2CData PDU (it is noted that this is merely marked generically within the CH PDU section to indicate that the Queue-ID field may be added to the CH in various ways, such as using the format depicted in FIG. 4). On receiving the PDU, the controller identifies the Queue associated with the CID of the WRITE command. An example embodiment of an H2CData PDU configured to support MQ-NVMe/TCP is depicted in FIG. 22 (denoted as H2CData PDU 2200). A host implements the method in FIG. 8 to send a H2CData PDU. A controller implements the method in FIG. 9 to process a H2CData PDU.

MQ-NVMe/TCP may be configured to support a Controller to Host Data (C2HData) PDU. C2HData PDU is used to transfer data from the controller to the host (for example, the data read by the host from the storage element). C2HData PDU corresponds to a READ command sent earlier by host to the controller. In a host, a command is uniquely identified by {Queue-ID, Command Identifier (CID)}. CID is unique only with respect to a Queue. The C2HData PDU carries the CCCID field (bytes 08-09) that encodes the CID of the READ command (SQE) that initiated the data transfer from controller to host. In NVMe/TCP, the PDU does not carry any explicit Queue-ID of the Queue, since the Queue-ID is implicit due to the 1:1 binding of the Queue to the TCP connection. In MQ-NVMe/TCP connection. In a MQ-NVMe/TCP connection, data can be transferred from controller to host for multiple Queues and, thus, the C2HDataPDU needs to also carry the Queue-ID associated with the READ command. The controller sets the QUEUE_ID_PRESENT bit to '1' and encodes the Queue-ID field in the PDU common header of the C2HData PDU (it is noted that this is merely marked generically within the CH PDU section to indicate that the Queue-ID field may be added to the CH in various ways, such as using the format depicted in FIG. 4). On receiving the PDU, the host identifies the Queue associated with the CID of the READ command. An example embodiment of a C2HData PDU configured to support MQ-NVMe/TCP is depicted in FIG. 23 (denoted as C2HData PDU 2300). A controller implements the method in FIG. 8 to send a C2HData PDU. A host implements the method in FIG. 9 to process a C2HData PDU.

MQ-NVMe/TCP may be configured to support a Ready to Transfer (R2T) PDU. The R2T PDU is used by the controller to notify the host that it is ready to receive data (in H2CData PDUs) that corresponds to a WRITE command sent earlier by the host to the controller. The R2T PDU provides a mechanism for the controller to control the rate of data transfer from the host to the controller. In a host, a command is uniquely identified by {Queue-ID, Command Identifier (CID)}. CID is unique only with respect to a Queue. The R2T PDU carries the CCCID field (bytes 08-09) that encodes the CID of the WRITE command (SQE) that initiated the data transfer from host to controller. In NVMe/TCP, the R2T PDU does not carry any explicit Queue-ID of the Queue, since the Queue-ID is implicit due to the 1:1 binding of the Queue to the TCP connection. In a MQ-NVMe/TCP connection, data can be transferred from host to controller for multiple Queues and, thus, the R2T PDU needs to also carry the Queue-ID associated with the WRITE command. The controller sets the QUEUE_ID_PRESENT bit to '1' and encodes the Queue-ID field in the PDU common header of the R2T PDU (it is noted that this is merely marked generically within the CH PDU section to indicate that the Queue-ID field may be added to the CH in various ways, such as using the format depicted in FIG. 4). On receiving the PDU, the host identifies the Queue associated with the CID of the command. An example embodiment of an R2T PDU configured to support MQ-NVMe/

TCP is depicted in FIG. 24 (denoted as R2T PDU 2400). A controller implements the method in FIG. 8 to send a R2T PDU. A host implements the method in FIG. 9 to process a R2T PDU.

MQ-NVMe/TPC may be configured to support disconnection of a Queue based on use of Disconnect Request and Response exchanges.

NVMe-oF supports a Disconnect Request and Disconnect Response exchange that can be used to delete a Queue. The Disconnect Request is sent by a host to a controller to delete a Queue and the Disconnect Response is sent by the controller to host to provide status of the Disconnect Request. The NVMe-oF Disconnect Request and Disconnect Response can be encoded in Command Capsules. It will be appreciated that the NVMe-oF Disconnect Request and Disconnect Response are not expected to be applicable to NVMe/TCP since, in NVMe/TCP, the deletion of Queue is done by deletion of the NVMe/TCP connection (due to the 1:1 mapping between the Queue and the NVMe/TCP connection).

MQ-NVMe/TCP may be configured to use Disconnect Request SQE and Disconnect Response CQE commands for dynamic deletion of a Queue using an MQ-NVMe/TCP connection.

In MQ-NVMe/TCP, for the Disconnect Request, the CapsuleCmd carrying the Disconnect Request SQE sets the QUEUE_ID_PRESENT bit to '1' and encodes the Queue-ID field in the PDU common header of the PDU (such as using the format depicted in FIG. 4). On receiving the PDU, the controller identifies the Queue to be deleted based on the Queue-ID field. An example embodiment of a Disconnect Request SQE configured to support MQ-NVMe/TCP is depicted in FIG. 25 (denoted as Disconnect Request SQE 2500).

In MQ-NVMe/TCP, for the Disconnect Response, the CapsuleResp carrying the Disconnect Response CQE sets the the QUEUE_ID_PRESENT bit to '1' and encodes the Queue-ID field in the PDU common header of the PDU (such as using the format depicted in FIG. 4). On receiving the PDU, the host identifies the Queue being deleted based on the Queue-ID field. An example embodiment of an Disconnect Response CQE configured to support MQ-NVMe/TCP is depicted in FIG. 26 (denoted as Disconnect Response CQE 2600).

Figure 27:
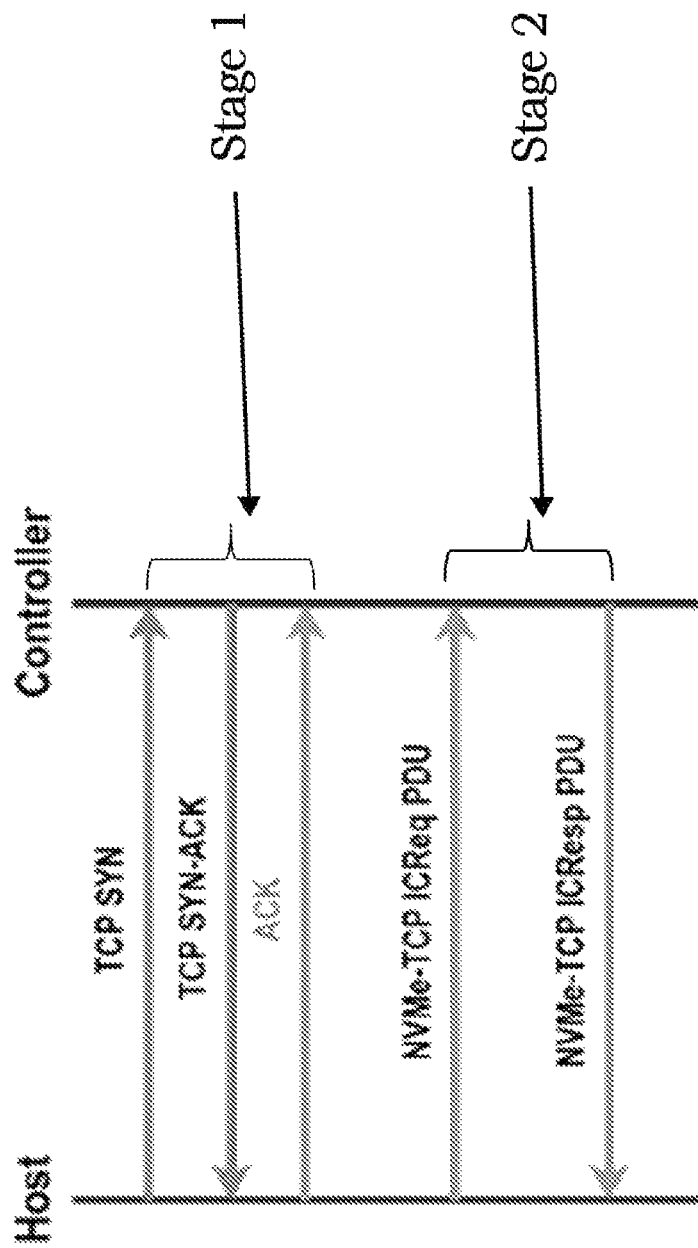
FIG. 27 depicts an example embodiment of a process for establishment of an MQ-NVMe/TCP connection between a host and a controller.

In MQ-NVMe/TCP, establishment of an MQ-NVMe/TCP connection between a host and a controller may involve two stages (as opposed to three stages typically used in NVMe/TCP). In NVMe/TCP, since the queue and the connection have a 1:1 binding, the connection establishment procedure includes a third stage that binds the Queue-ID with the connection. An example embodiment for establishment of an MQ-NVMe/TCP connection between a host and a controller is depicted in FIG. 27.

The first stage is establishment of a TCP connection between the host and the controller. The controller acts as the server side of the TCP connection and is set to "listen" for host-initiated TCP connection establishment requests.

The second stage is establishment of the MQ-NVMe/TCP connection. Once a TCP connection has been established, the host sends an Initialize Connection Request (ICReq) PDU to the controller. If the host supports MQ-NVMe/TCP, then the ICReq PDU is sent with the M-bit in the Flags field in the PDU common header set to 1 (otherwise, it may be set to 0 to indicated that use of MQ-NVMe/TCP is not supported). The host implements the method in FIG. 5 to send a ICReq PDU. When a controller receives an ICReq PDU, the controller processes the PDU and establishes the MQ-NVMe/TCP connection. The controller responds with an Initialize Connection Response (ICResp) PDU. If the controller supports MQ-NVMe/TCP, then the ICResp PDU is sent with M-bit in the Flags field in PDU common header set to 1 (otherwise, it may be set to 0 to indicated that use of MQ-NVMe/TCP is not supported). The controller implements the method in FIG. 6 to process the ICReq PDU. It is noted that this exchange may be used to both establish a MQ-NVMe/TCP connection and to exchange other information related to the MQ-NVMe/TCP connection (e.g., connection configuration parameters, features support, or the like, as well as various combinations thereof). It will be appreciated that, when both the host and the controller indicate support of MQ-NVMe/TCP then the connection is an MQ-NVMe/TCP connection (in which case the third connection establishment stage typically performed for NVMe/TCP connections is not needed), otherwise the connection is an NVMe/TCP connection (in which case the third connection establishment stage would be performed).

In MQ-NVMe/TCP, during the lifetime of an MQ-NVMe/TCP connection, Queues can be dynamically created between the host and the controller and dynamically deleted between the host and the controller.

In MQ-NVMe/TCP, during the lifetime of an MQ-NVMe/TCP connection, Queues can be dynamically created between the host and the controller. An example embodiment of a process for dynamic creation of a Queue between a host and a controller on an MQ-NVMe/TCP connection is presented in FIG. 28.

Figure 28:
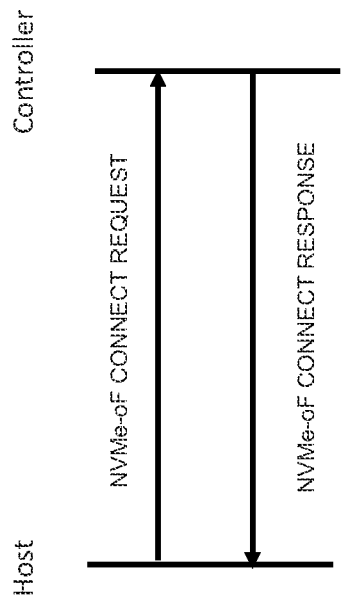
FIG. 28 depicts an example embodiment of a process for dynamic creation of a Queue between a host and a controller on an MQ-NVMe/TCP connection configured to support MQ-NVMe/TCP.

After a MQ-NVMe/TCP connection is established between the host and the controller, the host and controller are ready to create one or more Queues and exchange command capsules and data in the context of the one or more Queues. A Queue may be created by exchanging the NVMe-oF Connect Request/Response Command Capsules sequence as shown in FIG. 28. The host allocates a unique Queue-ID for the Queue, which is included in the NVMe-oF Connect Request/Response sequence. This exchange creates the Queue at the controller for the Queue-ID and creates a binding with the corresponding Queue on the host. The exchange also may be used to negotiate various characteristics of the Queue.

The format of a Connect Request SQE that is encoded in the Command Capsule PDU sent by host to the controller is depicted in FIGS. 14A and 14B. Octets 42-43 are the Queue-ID field where the Queue-ID allocated by the host for the Queue is encoded. Octets 2-3 are the Command Identifier (CID) that identifies this command within a Queue. So, the tuple {Queue-ID, CID} uniquely identifies the Connect Request command between the host and the controller. The CapsuleCmd PDU carrying the Connect Request SQE is set with QUEUE_ID_PRESENT bit to 1 and the Queue-ID field is included in PDU common header. The host implements the method in FIG. 8 to send the CapsuleCmd PDU and the controller implements the method in FIG. 9 to process the CapsuleCmd PDU.

The format of a Connect Response CQE that is encoded in the Command Capsule PDU sent by the controller to the host is depicted in FIG. 19. Octets 12-13 are the CID of the Connect Request against which the response is sent. The CapsuleResp PDU carrying the Connect Response is set with QUEUE_ID_PRESENT bit to 1 and Queue-ID field is included in the PDU common header. The controller implements the method in FIG. 8 to send the CapsuleResp PDU.

The host, upon receiving the Connect Response, finds the corresponding Connect Request from the CID and then the finds the Queue from the Queue-ID in the CapsuleResp PDU. The host implements the method in FIG. 9 to process the CapsuleResp PDU.

It is noted during the lifetime of a MQ-NVMe/TCP connection, the host can create multiple Queues with the controller by using process in FIG. 28 for each Queue.

In MQ-NVMe/TCP, during the lifetime of an MQ-NVMe/TCP connection, Queues can be dynamically created between the host and the controller. An example embodiment of a process for dynamic deletion of a Queue between a host and a controller on an MQ-NVMe/TCP connection is presented in FIG. 29.

Figure 29:
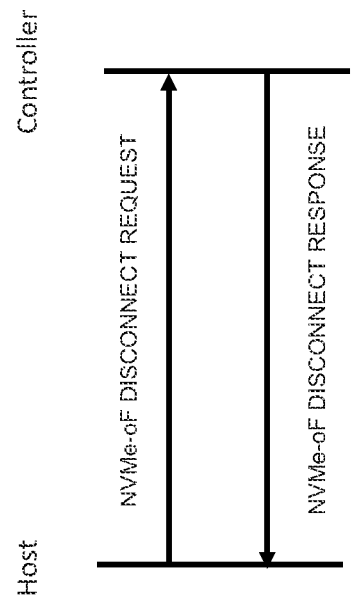
FIG. 29 depicts an example embodiment of a process for dynamic deletion of a Queue between a host and a controller on an MQ-NVMe/TCP connection configured to support MQ-NVMe/TCP.

After a MQ-NVMe/TCP connection is established between the host and the controller, the host and controller may create one or more Queues and exchange command capsules and data in the context of the one or more Queues. During the lifetime of a MQ-NVMe/TCP connection, Queues multiplexed on the connection can be dynamically deleted by the host anytime. A Queue may be deleted by exchanging the NVMe-oF Connect Request/Response Command Capsules sequence as shown in FIG. 29.

The format of Disconnect Request SQE that is encoded in the CapsuleCmd PDU sent by host to the controller is depicted in FIG. 25. The CapsuleCmd PDU is set with QUEUE_ID_PRESENT bit to 1 and Queue-ID field is included in PDU common header (e.g., using the format in FIG. 4). The host implements the method in FIG. 8 to send the CapsuleCmd PDU. Octets 2-3 is the Command Identifier (CID) that uniquely identifies this command sent by the host.

The format of Disconnect Response CQE that is encoded in the CapsuleResp PDU sent by controller to the host is depicted in FIG. 26. Octets 12-13 is CID of the Disconnect Request against which the response is sent. The CapsuleResp PDU is set with QUEUE_ID_PRESENT bit to 1 and Queue-ID field is included in PDU common header (e.g., using the format in FIG. 4). The controller implements the method in FIG. 8 to send the CapsuleResp PDU.

The host, upon receiving the Disconnect Response, finds the corresponding Disconnect Request from the CID and then the finds the Queue from the Queue-ID in the CapsuleResp PDU. The host implements the method in FIG. 9 to process the CapsuleResp PDU.

MQ-NVMe/TCP may be configured to support transfer of data from the host to the controller. This is for writing of data from the host to the NVM sub-system. An example embodiment of a process for transferring data from a host to a controller within the context of MQ-NVMe/TCP is presented in FIG. 30.

Figure 30:
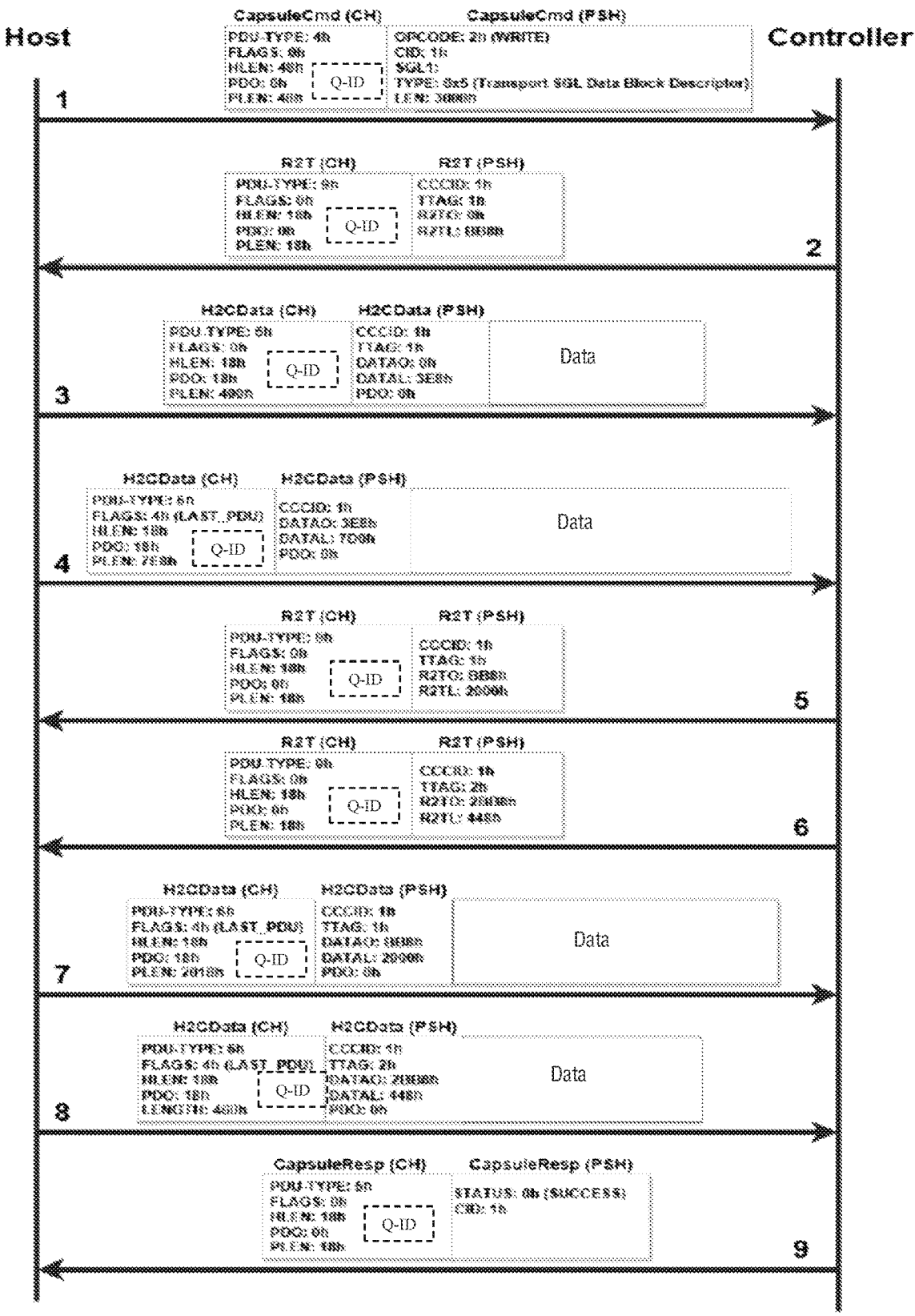
FIG. 30 depicts an example embodiment of a process for transferring data from a host to a controller within the context of MQ-NVMe/TCP.

As depicted in FIG. 30, the host issues a CapsuleCmd PDU including SQE for a Write Command. The CapsuleCmd PDU is sent with the QUEUE_ID_PRESENT bit set to 1 and the Queue-ID field is included in the PDU common header (e.g., using the format in FIG. 4). The Queue-ID field is encoded with the Queue-ID of the Queue for which the Write Command is issued. This is the exchange 1 in FIG. 30. The host implements the method in FIG. 8 to send the CapsuleCmd PDU for the Write Command. The controller implements the method in FIG. 9 to process the CapsuleCmdPDU.

As depicted in FIG. 30, the controller sends a "Ready to Transfer" (R2T) solicitation to the host to indicate its readiness to receive data. It specifies the size of data the controller is ready to receive. This is exchange 2 in FIG. 30. The R2T PDU is sent with the QUEUE_ID_PRESENT bit set to 1 and the Queue-ID field is included in the PDU common header (e.g., using the format in FIG. 4). The Queue-ID field is encoded with the Queue-ID of the Queue for which R2T solicitation is issued. The controller implements the method in FIG. 8 to send the R2T PDU. The host implements the method in FIG. 9 to process the R2T PDU.

As depicted in FIG. 30, the host sends Data for the R2T using one or more H2CData PDUs. In this case, the host decided to segregate the requested data into two H2CData PDUs. This is shown in exchanges 3-4 in FIG. 30. Each H2CData PDU is sent with the QUEUE_ID_PRESENT bit set to 1 and the Queue-ID field is included in PDU common header (e.g., using the format in FIG. 4). The Queue-ID field is encoded with the Queue-ID of the Queue for which data is being sent. The host implements the method in FIG. 8 to send each H2CData PDU. The controller implements the method in FIG. 9 to process an H2CData PDU.

As depicted in FIG. 30, the controller sends two R2T solicitations to the host. Each R2T PDU specifies the size of data. This is shown in exchanges 5-6 in FIG. 30. The controller implements the method in FIG. 8 to send each R2T PDU. The host implements the method in FIG. 9 to process a R2T PDU.

As depicted in FIG. 30, the host sends a H2CData PDU for each R2T solicitation. This is shown in exchanges 7-8 in FIG. 30. This completes the transfer of all data from the host to the controller. Each H2CData PDU is sent with the QUEUE_ID_PRESENT bit set to 1 and the Queue-ID field is included in the PDU common header (e.g., using the format in FIG. 4). The Queue-ID field is encoded with the Queue-ID of the Queue for which data is being sent. The host implements the method in FIG. 8 to send each H2CData PDU. The controller implements the method in FIG. 9 to process a H2CData PDU.

As depicted in FIG. 30, the controller sends a CapsuleResp PDU containing CQE for the SQE at block 1. This is shown as the exchange 9 in FIG. 30. The CapsuleResp PDU is sent with the QUEUE_ID_PRESENT bit to 1 and the Queue-ID field is included in PDU common header (e.g., using the format in FIG. 4). The Queue-ID field is encoded with the Queue-ID of the Queue for which the response is being sent. Controller implements the method in FIG. 8 to send the CapsuleResp PDU and the host implements the method in FIG. 9 to process the CapsuleResp PDU.

MQ-NVMe/TCP may be configured to support transfer of data from the controller to the host. This is for reading of data by the host from the NVM sub-system. An example embodiment of a process for transferring data from a controller to a host within the context of MQ-NVMe/TCP is presented in FIG. 31.

Figure 31:
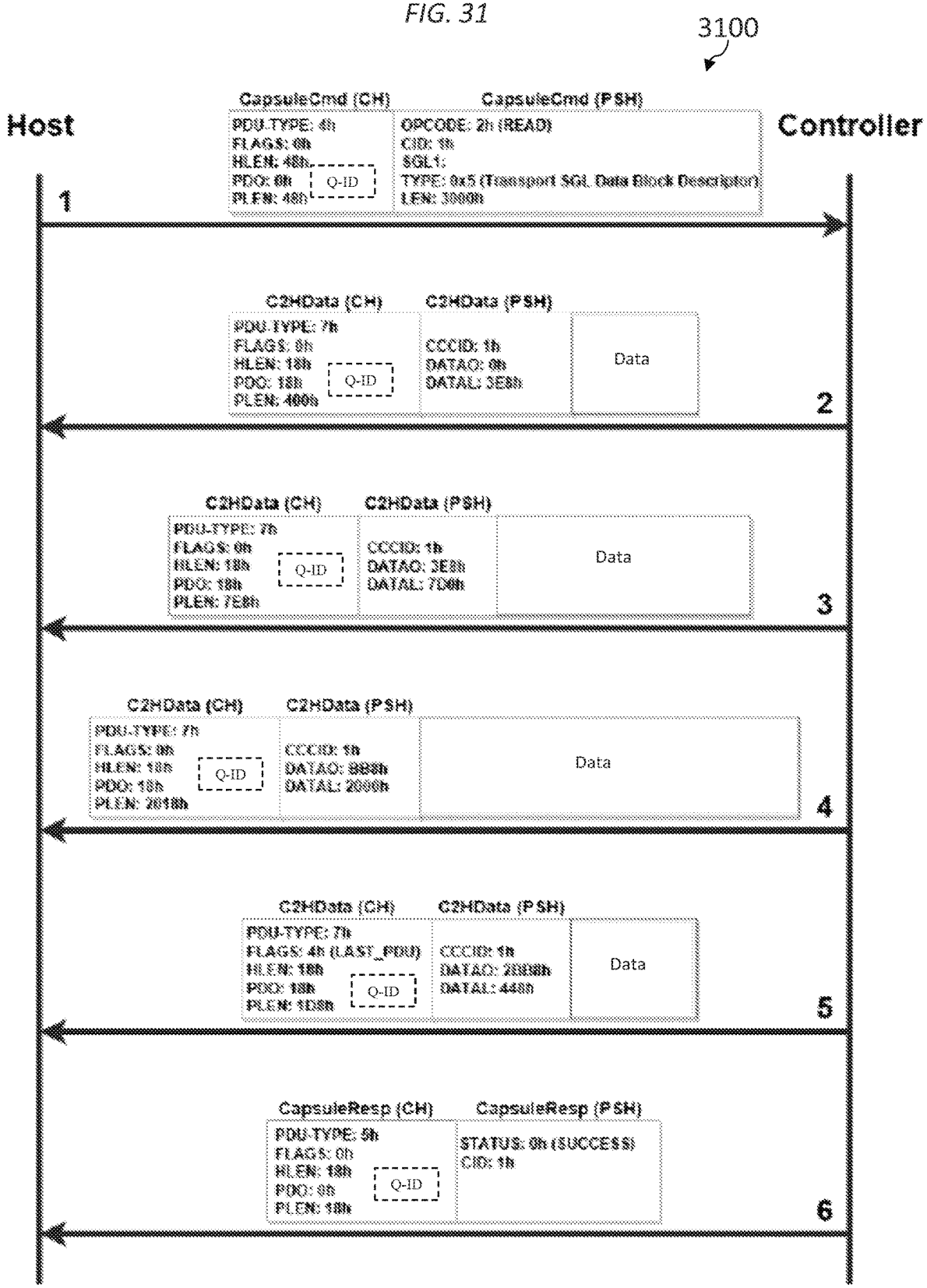
FIG. 31 depicts an example embodiment of a process for transferring data from a controller to a host within the context of MQ-NVMe/TCP.

As depicted in FIG. 31, the host issues a CapsuleCmd PDU including the SQE for a Read Command. The CapsuleCmd PDU is sent with the QUEUE_ID_PRESENT bit set to 1 and the Queue-ID field is included in PDU common header (e.g., using the format in FIG. 4). The Queue-ID field is encoded with the Queue-ID of the Queue for which the Read Command is issued. This is the exchange 1 in FIG. 31. The host implements the method in FIG. 8 to send the CapsuleCmd PDU. The controller implements the method in FIG. 9 to process the CapsuleCmd PDU.

As depicted in FIG. 31, the controller sends one or more C2HData PDUs to the host containing the blocks of data read from the NVM. In this case, the data is transferred in four C2HData PDUs. Each C2HData PDU is sent with the QUEUE_ID_PRESENT bit set to 1 and the Queue-ID field is included in the PDU common header (e.g.,, using the format in FIG. 4). The Queue-ID field is encoded with the Queue-ID of the Queue for which the data is being transferred. This is shown in exchanges 2-5 in FIG. 31. The controller implements the method in FIG. 8 to send each C2HData PDU and the host implements the method in FIG. 9 to process each C2HData PDU.

As depicted in FIG. 31, the controller sends a CapsuleResp PDU including the CQE for the SQE at block 1. The CapsuleResp PDU is sent with the QUEUE_ID_PRESENT bit set to 1 and Queue-ID field is included in the PDU common header (e.g., using the format in FIG. 4). The Queue-ID field is encoded with the Queue-ID of the Queue for which the response is being sent. This is shown as the exchange 6 in FIG. 31. The controller implements the method in FIG. 8 to send the CapsuleResp PDU and host implements the method in FIG. 9 to process the CapsuleResp PDU.

Figure 32:
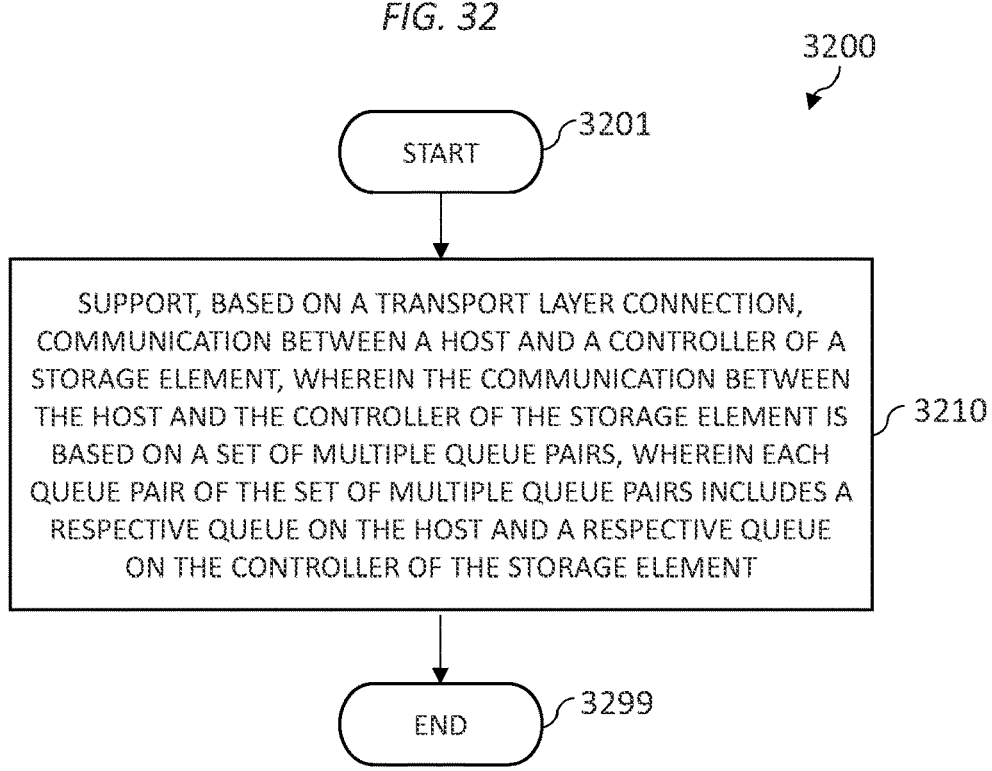
FIG. 32 depicts an example embodiment of a method for supporting communication between a host and a controller of a storage element.

FIG. 32 depicts an example embodiment of a method for supporting communication between a host and a controller of a storage element. The method 3200 may be executed by the host or by the controller of the storage element. At block 3201, the method 3200 begins. At block 3210, support, based on a transport layer connection, communication between a host and a controller of a storage element, wherein the communication between the host and the controller of the storage element is based on a set of multiple queue pairs, wherein each queue pair of the set of multiple queue pairs includes a respective queue on the host and a respective queue on the controller of the storage element. The multiple queues on the host may be disposed on a core of the host. The multiple queues on the host may be disposed on two or more cores of the host. The communication between the host and the controller of the storage element may include communication related to storage of data by the host in the storage element. The communication related to storage of data by the host in the storage element may include at least one of a communication related to writing a data item in the storage element, a communication related to reading a data item from the storage element, or a communication related to flushing a data item from the storage element. For each queue pair of the set of multiple queue pairs, the respective queue on the host may include a send queue configured to send messages toward the respective queue on the controller of the storage element and a receive queue configured to receive messages from the respective queue on the controller of the storage element. For each queue pair of the set of multiple pairs, the respective queue on the controller of the storage element includes a receive queue configured to receive messages from the respective queue on the host and a send queue configured to send messages toward the respective queue on the host. For each queue pair of the set of multiple queue pairs, the respective queue pair may include a first pair of queues including a send queue on the host and a receive queue on the controller of the storage element for supporting communication from the host to the controller of the storage element and a second pair of queues including a send queue on the controller of the storage element and a receive queue on the host for supporting communication from the controller of the storage element to the host. The support for communication between the host and the controller of the storage element may include supporting establishment of the transport layer connection between the host and the controller of the storage element. The support for communication between the host and the controller of the storage element may include supporting establishment of a storage access protocol connection between the host and the controller of the storage element. The support for establishment of the storage access protocol connection between the host and the controller of the storage element may include negotiating, between the host and the controller of the storage element, a capability to use a transport layer protocol to support communication between multiple queues on the host and multiple queues on the controller of the storage element. The negotiation of the capability to use a transport layer protocol to support communication between multiple queues on the host and multiple queues on the controller of the storage element may include sending an indicator indicative that use of a transport layer protocol to support communication between multiple queues on the host and multiple queues on the controller of the storage element is supported. The support for the establishment of the storage access protocol connection between the host and the controller of the storage element may include sending, by the host toward the controller of the storage element, an initialize connection request including a first indication that the host supports use of a transport layer protocol to support communication between multiple queues on the host and multiple queues on the controller of the storage element, receiving, by the host from the controller of the storage element, an initialize connection response including a second indication that the controller of the storage element supports use of a transport layer protocol to support communication between multiple queues on the host and multiple queues on the controller of the storage element, and establishing, by the host based on the first indication and the second indication, the storage access protocol connection between the host and the controller of the storage element in a manner for supporting use of a transport layer protocol to support communication between multiple queues on the host and multiple queues on the controller of the storage element. The support for the establishment of the storage access protocol connection between the host and the controller of the storage element may include receiving, by the controller of the storage element from the host, an initialize connection request including a first indication that the host supports use of a transport layer protocol to support communication between multiple queues on the host and multiple queues on the controller of the storage element and sending, by the controller of the storage element toward the host, an initialize connection response including a second indication that the controller of the storage element supports use of a transport layer protocol to support communication between multiple queues on the host and multiple queues on the controller of the storage element. The support for the communication between the host and the controller of the storage element may include supporting communication of data between the host and the controller of the storage element using one of the queue pairs. The support for the communication of data between the host and the controller of the storage element using the one of the queue pairs may include supporting communication of a protocol data unit having a header including a queue identifier configured to identify the one of the queue pairs. The header of the protocol data unit may include an indicator configured to indicate a presence of the queue identifier in the header of the protocol data unit. The indicator configured to indicate the presence of the queue identifier in the header of the protocol data unit may include at least one bit in a flags field of the header of the protocol data unit. The support for the communication between the host and the controller of the storage element may include supporting, based on the transport layer connection, sending of data from the host to the controller of the storage element using one of the queue pairs. The support for the sending of data from the host to the controller of the storage element using the one of the queue pairs may include sending, by the host toward the controller of the storage element using the transport layer connection, a protocol data unit including a command identifier configured to indicate that the protocol data unit is associated with a write command, a queue identifier configured to indicate the one of the queue pairs, and the data. The support for the sending of data from the host to the controller of the storage element using the one of the queue pairs may include receiving, by the controller of the storage element from the host, a protocol data unit including a command identifier configured to indicate that the protocol data unit is associated with a write command, a queue identifier configured to indicate the one of the queue pairs, and the data and initiating, by the controller of the storage element based on the command identifier and the queue identifier, writing of the data in the storage element. The support for the communication between the host and the controller of the storage element may include supporting, based on the transport layer connection, sending of data from the controller of the storage element to the host using one of the queue pairs. The support for the sending of data from the controller of the storage element to the host using the one of the queue pairs may include sending, by the controller of the storage element toward the host, a protocol data unit including a command identifier configured to indicate that the protocol data unit is associated with a read command, a queue identifier configured to indicate the one of the queue pairs, and the data. The support for the sending of data from the controller of the storage element to the host using the one of the queue pairs may include receiving, by the host from the controller of the storage element, a protocol data unit including a command identifier configured to indicate that the protocol data unit is associated with a read command, a queue identifier configured to indicate the one the queue pairs, and the data and initiating, by the host based on the command identifier and the queue identifier, handling of the data. The communications for the multiple queues on the host may be supported by a set of multiple transport layer subflows of the transport layer connection (e.g., MP-TCP subflows, SCTP subflows, or the like). The communication between the host and the controller of the storage element may be based on a storage access and transport protocol. The storage access and transport protocol may include a Multi-Queue Non-Volatile Memory Express (MQ-NVMe) protocol. The transport layer connection may include a TCP connection, an MP-TCP connection, an SCTP connection, a QUIC connection, or other suitable transport layer connection.

Figure 33:
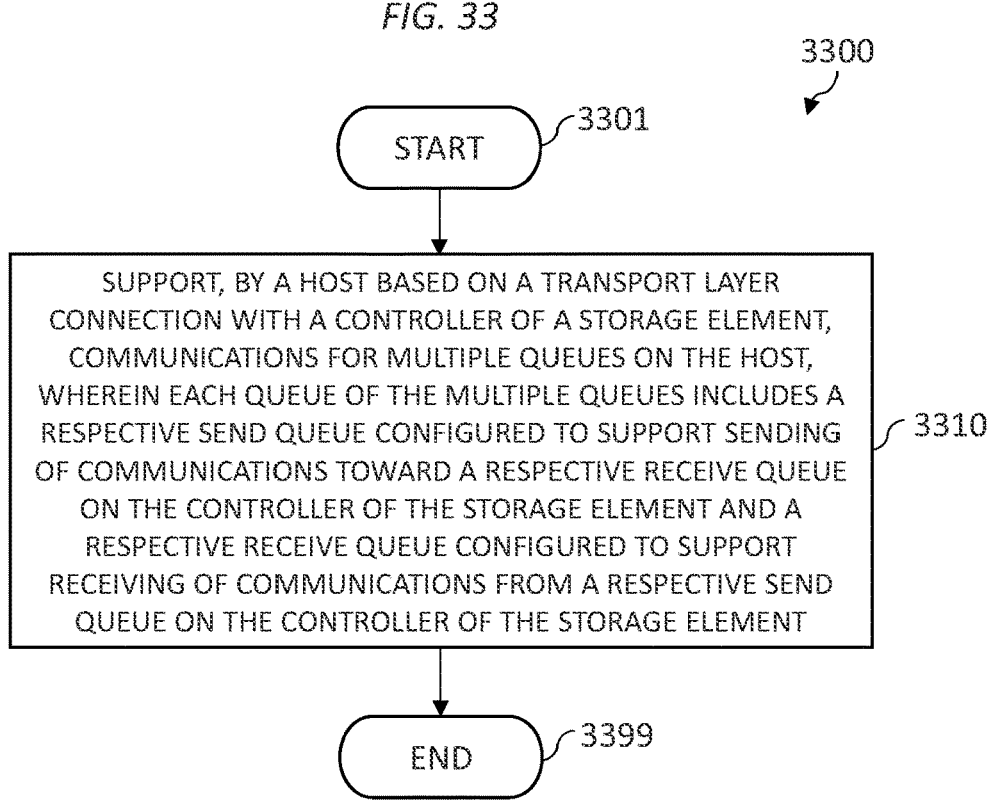
FIG. 33 depicts an example embodiment of a method for supporting communication by a host with a controller of a storage element.

FIG. 33 depicts an example embodiment of a method for supporting communication between a host and a controller of a storage element. The method 3300 may be executed by the host. At block 3301, the method 3300 begins. At block 3310, support, by a host based on a transport layer connection with a controller of a storage element, communications for multiple queues on the host, wherein each queue of the multiple queues includes a respective send queue configured to support sending of communications toward a respective receive queue on the controller of the storage element and a respective receive queue configured to support receiving of communications from a respective send queue on the controller of the storage element. At block 3399, the method 3300 ends. The multiple queues on the host may be disposed on a core of the host. The multiple queues on the host may be disposed on two or more cores of the host. The communications for the multiple queues on the host may include communications related to storage of data by the host in the storage element. The communications related to storage of data by the host in the storage element may include at least one of a communication related to writing a data item in the storage element, a communication related to reading a data item from the storage element, or a communication related to flushing a data item from the storage element. The support for the communications for the multiple queues on the host may include supporting establishment of the transport layer connection between the host and the controller of the storage element. The support for the communications for the multiple queues on the host may include supporting establishment of a storage access protocol connection between the host and the controller of the storage element. The support for the establishment of the storage access protocol connection between the host and the controller of the storage element may include negotiating, by the host with the controller of the storage element, a capability to use a transport layer protocol to support communication between the multiple queues on the host and multiple queues on the controller of the storage element. The negotiation of the capability to use a transport layer protocol to support communication between the multiple queues on the host and the multiple queues on the controller of the storage element may include sending an indicator indicative that use of a transport layer protocol to support communication between the multiple queues on the host and the multiple queues on the controller of the storage element is supported. The support for the establishment of the storage access protocol connection between the host and the controller of the storage element may include sending, by the host toward the controller of the storage element, an initialize connection request including a first indication that the host supports use of a transport layer protocol to support communication between the multiple queues on the host and multiple queues on the controller of the storage element, receiving, by the host from the controller of the storage element, an initialize connection response including a second indication that the controller of the storage element supports use of a transport layer protocol to support communication between the multiple queues on the host and the multiple queues on the controller of the storage element, and establishing, by the host based on the first indication and the second indication, the storage access protocol connection between the host and the controller of the storage element in a manner for supporting use of a transport layer protocol to support communication between the multiple queues on the host and the multiple queues on the controller of the storage element. The support for the communications for the multiple queues on the host may include supporting communication of data between the host and the controller of the storage element using one of the multiple queues. The support for communication of data between the host and the controller of the storage element using one of the multiple queues may include supporting communication of a protocol data unit having a header including a queue identifier configured to identify the one of the multiple queues. The header of the protocol data unit may include an indicator configured to indicate a presence of the queue identifier in the header of the protocol data unit. The indicator configured to indicate the presence of the queue identifier in the header of the protocol data unit may include at least one bit in a flags field of the header of the protocol data unit. The support for the communications for the multiple queues on the host may include supporting, based on the transport layer connection, sending of data from the host toward the controller of the storage element using one of the multiple queues. The support for the sending of data from the host toward the controller of the storage element using the one of the multiple queues may include sending, by the host toward the controller of the storage element using the transport layer connection, a protocol data unit including a command identifier configured to indicate that the protocol data unit is associated with a write command, a queue identifier configured to indicate the one of the multiple queues, and the data. The support for the communications for the multiple queues on the host may include support, based on the transport layer connection, receiving of data by the host from the controller of the storage element using one of the multiple queues. The support for the sending of data from the host toward the controller of the storage element using the one of the multiple queues may include receiving, by the host from the controller of the storage element using the transport layer connection, a protocol data unit including a command identifier configured to indicate that the protocol data unit is associated with a read command, a queue identifier configured to indicate the one of the multiple queues, and the data. The communications for the multiple queues on the host may be supported by a set of multiple transport layer subflows of the transport layer connection (e.g., MP-TCP subflows, SCTP subflows, or the like). The communications for the multiple queues on the host may be based on a storage access and transport protocol. The storage access and transport protocol may include a Multi-Queue Non-Volatile Memory Express (MQ-NVMe) protocol. The transport layer connection may include a TCP connection, an MP-TCP connection, an SCTP connection, a QUIC connection, or other suitable transport layer connection.

Figure 34:
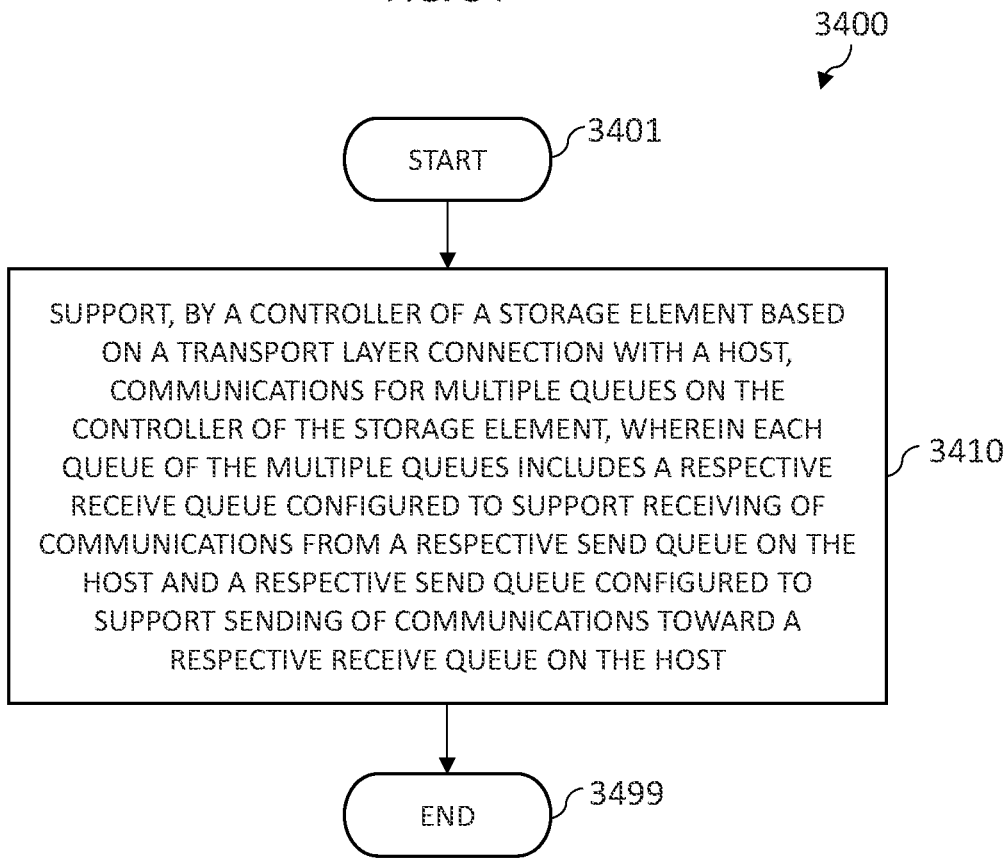
FIG. 34 depicts an example embodiment of a method for supporting communication by a controller of a storage element with a host.

FIG. 34 depicts an example embodiment of a method for supporting communication by a controller of a storage element with a host. The method 3400 may be executed by the controller of the storage element. At block 3401, the method 3400 begins. At block 3410, support, by a controller of a storage element based on a transport layer connection with a host, communications for multiple queues on the controller of the storage element, wherein each queue of the multiple queues includes a respective receive queue configured to support receiving of communications from a respective send queue on the host and a respective send queue configured to support sending of communications toward a respective receive queue on the host. At block 3499, the method 3400 ends. The communications for the multiple queues on the controller of the storage element may include communications related to storage of data by the host in the storage element. The communications related to storage of data by the host in the storage element may include at least one of a communication related to writing a data item in the storage element, a communication related to reading a data item from the storage element, or a communication related to flushing a data item from the storage element. The support for the communications for the multiple queues on the controller of the storage element may include supporting establishment of the transport layer connection between the controller of the storage element and the host. The support for the communications for the multiple queues on the controller of the storage element may include supporting establishment of a storage access protocol connection between the controller of the storage element and the host. The support for the establishment of the storage access protocol connection between the controller of the storage element and the host may include negotiating, by the controller of the storage element with the host, a capability to use a transport layer protocol to support communication between the multiple queues on the controller of the storage element and multiple queues on the host. The negotiation of the capability to use a transport layer protocol to support communication between the multiple queues on the controller of the storage element and the multiple queues on the host may include sending an indicator indicative that use of a transport layer protocol to support communication between the multiple queues on the controller of the storage element and the multiple queues on the host is supported. The support for the establishment of the storage access protocol connection between the controller of the storage element and the host may include receiving, by the controller of the storage element from the host, an initialize connection request including a first indication that the host supports use of a transport layer protocol to support communication between the multiple queues on the host and multiple queues on the controller of the storage element and sending, by the controller of the storage element toward the host, an initialize connection response including a second indication that the controller of the storage element supports use of a transport layer protocol to support communication between the multiple queues on the host and the multiple queues on the controller of the storage element. The support for the communications for the multiple queues on the controller of the storage element may include supporting communication of data between the controller of the storage element and the host using one of the multiple queues. The support for communication of data between the controller of the storage element and the host using one of the multiple queues may include supporting communication of a protocol data unit having a header including a queue identifier configured to identify the one of the multiple queues. The header of the protocol data unit may include an indicator configured to indicate a presence of the queue identifier in the header of the protocol data unit. The indicator configured to indicate the presence of the queue identifier in the header of the protocol data unit may include at least one bit in a flags field of the header of the protocol data unit. The support for the communications for the multiple queues on the controller of the storage element may include supporting, based on the transport layer connection, receiving of data by the controller of the storage element from the host using one of the multiple queues. The support for the receiving of data by the controller of the storage element from the host using the one of the multiple queues may include receiving, by the controller of the storage element from the host using the transport layer connection, a protocol data unit including a command identifier configured to indicate that the protocol data unit is associated with a write command, a queue identifier configured to indicate the one of the multiple queues, and the data. The support for the communications for the multiple queues on the controller of the storage element may include supporting, based on the transport layer connection, sending of data from the controller of the storage element toward the host using one of the multiple queues. The support for the sending of data from the controller of the storage element toward the host using the one of the multiple queues may include sending, by the controller of the storage element toward the host using the transport layer connection, a protocol data unit including a command identifier configured to indicate that the protocol data unit is associated with a read command, a queue identifier configured to indicate the one of the multiple queues, and the data. The communications for the multiple queues on the controller of the storage element may be supported by a set of multiple transport layer subflows of the transport layer connection. The communications for the multiple queues on the controller of the storage element may be based on a storage access and transport protocol. The storage access and transport protocol may include a Multi-Queue Non-Volatile Memory Express (MQ-NVMe) protocol. The transport layer connection may include a TCP connection, an MP-TCP connection, an SCTP connection, a QUIC connection, or other suitable transport layer connection.

Figure 35:
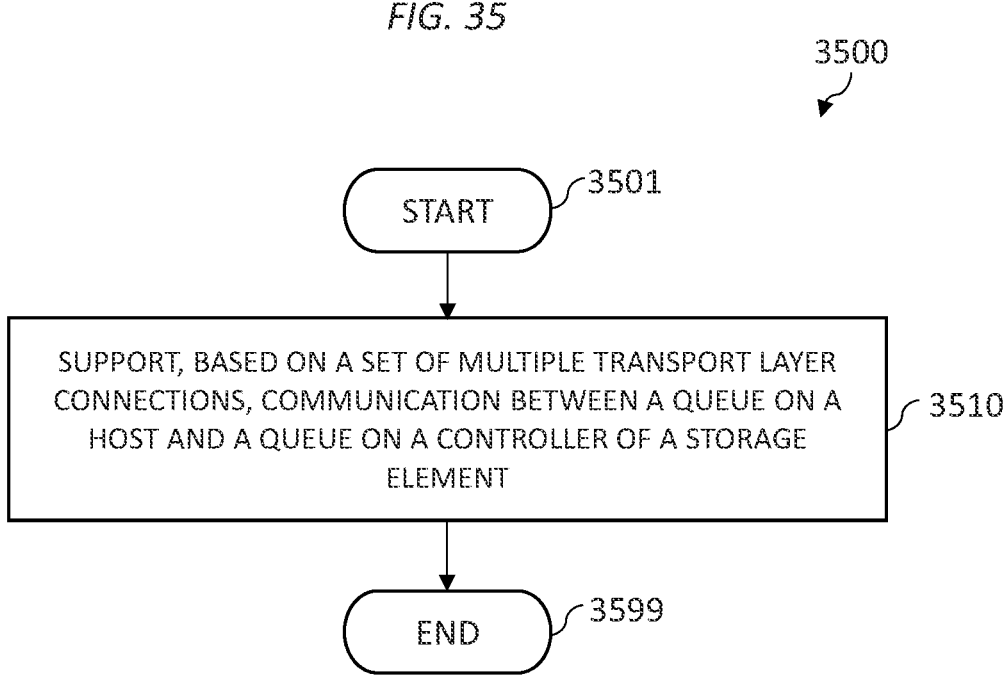
FIG. 35 depicts an example embodiment of a method for supporting communication between a host and a controller of a storage element.

FIG. 35 depicts an example embodiment of a method for supporting communication between a host and a controller of a storage element. The method 3500 may be executed by the host or by the controller of the storage element. At block 3501, the method 3500 begins. At block 3510, support, based on a set of multiple transport layer connections, communication between a queue on a host and a queue on a controller of a storage element. At block 3599, the method 3500 ends.

Figure 36:
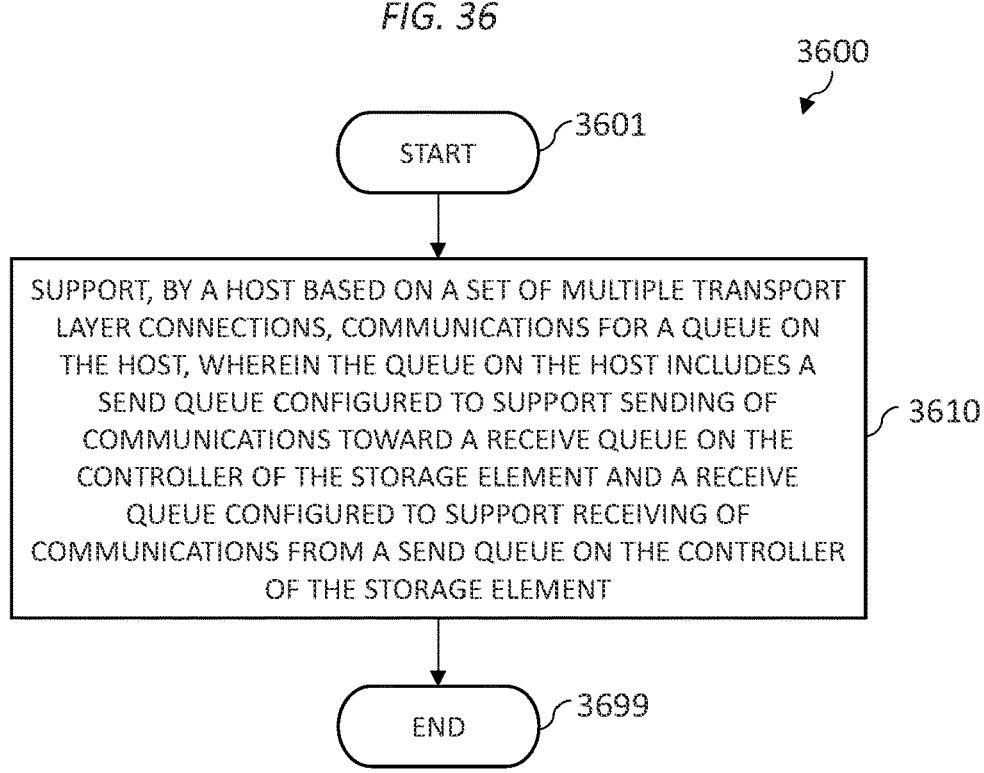
FIG. 36 depicts an example embodiment of a method for supporting communication by a host with a controller of a storage element.

FIG. 36 depicts an example embodiment of a method for supporting communication by a host with a controller of a storage element. The method 3600 may be executed by the host. At block 3601, the method 3600 begins. At block 3610, support, by a host based on a set of multiple transport layer connections, communications for a queue on the host, wherein the queue on the host includes a send queue configured to support sending of communications toward a receive queue on the controller of the storage element and a receive queue configured to support receiving of communications from a send queue on the controller of the storage element. At block 3699, the method 3600 ends.

Figure 37:
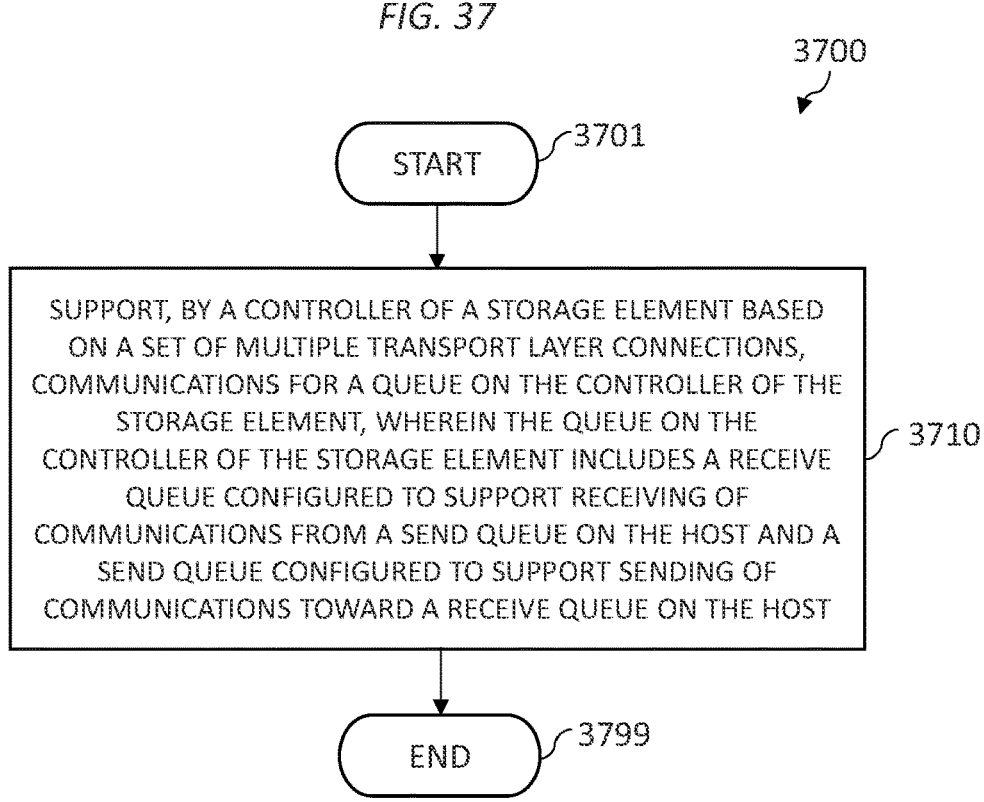
FIG. 37 depicts an example embodiment of a method for supporting communication by a controller of a storage element with a host.

FIG. 37 depicts an example embodiment of a method for supporting communication by a controller of a storage element with a host. The method 3700 may be executed by the controller of the storage element. At block 3701, the method 3700 begins. At block 3710, support, by a controller of a storage element based on a set of multiple transport layer connections, communications for a queue on the controller of the storage element, wherein the queue on the controller of the storage element includes a receive queue configured to support receiving of communications from a send queue on the host and a send queue configured to support sending of communications toward a receive queue on the host. At block 3799, the method 3700 ends.

It will be appreciated that, although primarily presented herein with respect to embodiments in which the underlying transport layer protocol is TCP (and, thus, various example embodiments of MQ-NVMe are primarily referred to herein as MQ-NVMe/TCP), various example embodiments of MQ-NVMe may be supported using various other transport layer protocols, such as MP-TCP (e.g., in which case various example embodiments of MQ- NVMe are primarily referred to herein as MQ-NVMe/MP-TCP), SCTP (e.g., in which case various example embodiments of MQ-NVMe are primarily referred to herein as MQ- NVMe/SCTP), QUIC (e.g., in which case various example embodiments of MQ-NVMe are primarily referred to herein as MQ-NVMe/QUIC), or the like.

It will be appreciated that, although primarily presented herein using the terms "send queue" and "receive queue" for referring to queues which form part of the two queues of a queue pair including a queue on the host and a queue on the controller of the storage element, in at least some example embodiments where communications between the host and the controller of the storage element are based on command<->response communications (e.g., using example embodiments based on NVMe and referred to herein as MQ-NVMe or using other suitable command<->response based protocols) the "send queues" and "receive queues" also or alternatively may be referred to as "submission queues" and "completion queues" (e.g., respective submission queues on the host (e.g., a core of a host) and the controller of the storage element for communications from the host to the controller of the storage element and respective completion queues on the controller of the storage element and the host (e.g., a core of a host) for communications from the controller of the storage element to the host) or, more generally, as "request queues" and "response queues" (e.g., respective request queues on the host (e.g., a core of a host) and the controller of the storage element for communications from the host to the controller of the storage element and respective response queues on the controller of the storage element and the host (e.g., a core of a host) for communications from the controller of the storage element to the host).

Various example embodiments for supporting communications between a host and a controller may provide various advantages or potential advantages. For example, various example embodiments for supporting communications between a host and a controller may be configured to support multiplexing of two or more Queues on a single NVMe/TCP connection without interlocking of cores on the TCP connection when exchanging data on the respective Queues. For example, various example embodiments for supporting communications between a host and a controller may be configured to support spanning of a single Queue across two or more NVMe/TCP connections without suffering reordering of Capsules or Data. For example, various example embodiments may be configured to improve cost-performance and scalability of NVMe/TCP. Various example embodiments for supporting communications between a host and a controller may provide various other advantages or potential advantages.

Figure 38:
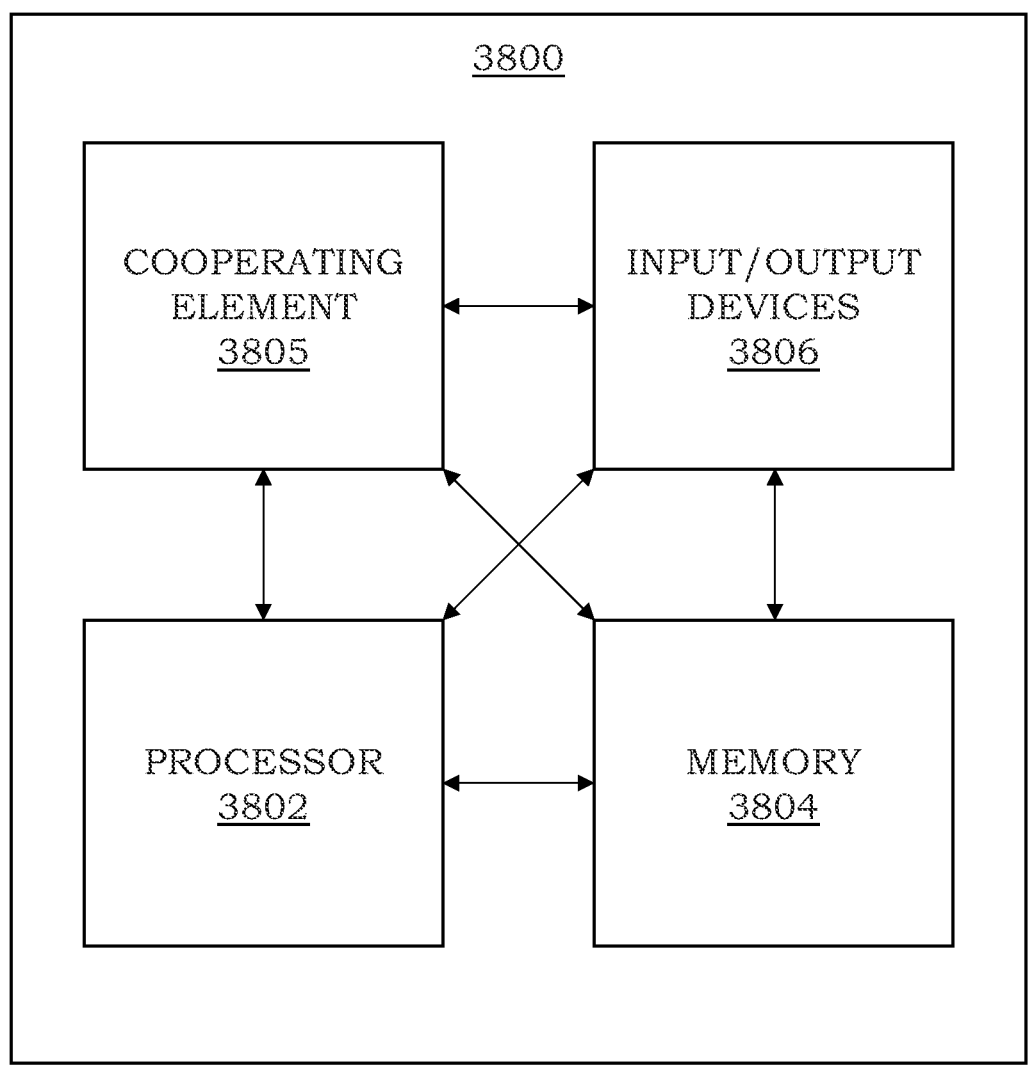
FIG. 38 depicts an example embodiment of a computer suitable for use in performing various functions presented herein.

FIG. 38 depicts an example embodiment of a computer suitable for use in performing various functions presented herein.

The computer 3800 includes a processor 3802 (e.g., a central processing unit (CPU), a processor, a processor having a set of processor cores, a processor core of a processor, or the like) and a memory 3804 (e.g., a random access memory, a read only memory, or the like). The processor 3802 and the memory 3804 may be communicatively connected. In at least some example embodiments, the computer 3800 may include at least one processor and at least one memory including a set of instructions, wherein the set of instructions is configured to, when executed by the at least one processor, cause the computer to perform various functions presented herein.

The computer 3800 also may include a cooperating element 3805. The cooperating element 3805 may be a hardware device. The cooperating element 3805 may be a process that can be loaded into the memory 3804 and executed by the processor 3802 to implement various functions presented herein (in which case, for example, the cooperating element 3805 (including associated data structures) can be stored on a non-transitory computer-readable storage medium, such as a storage device or other suitable type of storage element (e.g., a magnetic drive, an optical drive, or the like)).

The computer 3800 also may include one or more input/output devices 3806. The input/output devices 3806 may include one or more of a user input device (e.g., a keyboard, a keypad, a mouse, a microphone, a camera, or the like), a user output device (e.g., a display, a speaker, or the like), one or more network communication devices or elements (e.g., an input port, an output port, a receiver, a transmitter, a transceiver, or the like), one or more storage devices (e.g., a tape drive, a floppy drive, a hard disk drive, a compact disk drive, or the like), or the like, as well as various combinations thereof.

It will be appreciated that computer 3800 may represent a general architecture and functionality suitable for implementing functional elements described herein, portions of functional elements described herein, or the like, as well as various combinations thereof. For example, computer 3800 may provide a general architecture and functionality that is suitable for implementing one or more elements presented herein, such as a host or a portion thereof, a core of a host or a portion thereof, a storage element or a portion thereof, a controller of a storage element or a portion thereof, or the like, as well as various combinations thereof.

It will be appreciated that at least some of the functions presented herein may be implemented in software (e.g., via implementation of software on one or more processors, for executing on a general purpose computer (e.g., via execution by one or more processors) so as to provide a special purpose computer, and the like) and/or may be implemented in hardware (e.g., using a general purpose computer, one or more application specific integrated circuits, and/or any other hardware equivalents).

It will be appreciated that at least some of the functions presented herein may be implemented within hardware, for example, as circuitry that cooperates with the processor to perform various functions. Portions of the functions/elements described herein may be implemented as a computer program product wherein computer instructions, when processed by a computer, adapt the operation of the computer such that the methods and/or techniques described herein are invoked or otherwise provided. Instructions for invoking the various methods may be stored in fixed or removable media (e.g., non-transitory computer-readable media), transmitted via a data stream in a broadcast or other signal bearing medium, and/or stored within a memory within a computing device operating according to the instructions.

It will be appreciated that the term "or" as used herein refers to a non-exclusive "or" unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
   at least one processor; and
   at least one memory including instructions which, when executed by the at least one processor, cause the apparatus to:
   support, by a host based on a transport layer connection with a controller of a storage element, communications between the host and the controller of the storage element for multiple queues on the host, wherein each queue of the multiple queues includes a respective send queue configured to support sending of communications toward a respective receive queue on the controller of the storage element and a respective receive queue configured to support receiving of communications from a respective send queue on the controller of the storage element, wherein each queue of the multiple queues has a respective queue identifier associated therewith; and
   support communications between the host and the controller of the storage element for the multiple queues on the host based on the respective queue identifiers associated with the respective multiple queues.

2. The apparatus of claim 1, wherein the multiple queues on the host are disposed on a core of the host.

3. The apparatus of claim 1, wherein the multiple queues on the host are disposed on two or more cores of the host.

4. The apparatus of claim 1, wherein the communications between the host and the controller of the storage element for the multiple queues on the host include communications related to storage of data by the host in the storage element.

5. The apparatus of claim 4, wherein the communications related to storage of data by the host in the storage element includes at least one of a communication related to writing a data item in the storage element, a communication related to reading a data item from the storage element, or a communication related to flushing a data item from the storage element.

6. The apparatus of claim 1, wherein, to support the communications between the host and the controller of the storage element for the multiple queues on the host, the instructions, when executed by the at least one processor, cause the apparatus to:
   support establishment of the transport layer connection between the host and the controller of the storage element.

7. The apparatus of claim 1, wherein, to support the communications between the host and the controller of the storage element for the multiple queues on the host, the instructions, when executed by the at least one processor, cause the apparatus to:
   support establishment of a storage access protocol connection between the host and the controller of the storage element.

8. The apparatus of claim 7, wherein, to support the establishment of the storage access protocol connection between the host and the controller of the storage element, the instructions, when executed by the at least one processor, cause the apparatus to:
   negotiate, by the host with the controller of the storage element, a capability to use a transport layer protocol to support communication between the multiple queues on the host and multiple queues on the controller of the storage element.

9. The apparatus of claim 8, wherein, to negotiate the capability to use a transport layer protocol to support communication between the multiple queues on the host and the multiple queues on the controller of the storage element, the instructions, when executed by the at least one processor, cause the apparatus to:
   send an indicator indicative that use of a transport layer protocol to support communication between the multiple queues on the host and the multiple queues on the controller of the storage element is supported.

10. The apparatus of claim 7, wherein, to support the establishment of the storage access protocol connection between the host and the controller of the storage element, the instructions, when executed by the at least one processor, cause the apparatus to:
    send, by the host toward the controller of the storage element, an initialize connection request including a first indication that the host supports use of a transport layer protocol to support communication between the multiple queues on the host and multiple queues on the controller of the storage element;
    receive, by the host from the controller of the storage element, an initialize connection response including a second indication that the controller of the storage element supports use of a transport layer protocol to support communication between the multiple queues on the host and the multiple queues on the controller of the storage element; and establish, by the host based on the first indication and the second indication, the storage access protocol connection between the host and the controller of the storage element in a manner for supporting use of a transport layer protocol to support communication between the multiple queues on the host and the multiple queues on the controller of the storage element.

11. The apparatus of claim 1, wherein, to support the communications between the host and the controller of the storage element for the multiple queues on the host, the instructions, when executed by the at least one processor, cause the apparatus to:

support communication of data between the host and the controller of the storage element using one of the multiple queues.

12. The apparatus of claim 11, wherein, to support communication of data between the host and the controller of the storage element using one of the multiple queues, the instructions, when executed by the at least one processor, cause the apparatus to:

support communication of a protocol data unit having a header including the respective queue identifier associated with the one of the multiple queues.

13. The apparatus of claim 12, wherein the header of the protocol data unit includes an indicator configured to indicate a presence of the respective queue identifier in the header of the protocol data unit.

14. The apparatus of claim 13, wherein the indicator configured to indicate the presence of the respective queue identifier in the header of the protocol data unit includes at least one bit in a flags field of the header of the protocol data unit.

15. The apparatus of claim 1, wherein, to support the communications between the host and the controller of the storage element for the multiple queues on the host, the instructions, when executed by the at least one processor, cause the apparatus to:

support, based on the transport layer connection, sending of data from the host toward the controller of the storage element using one of the multiple queues.

16. The apparatus of claim 15, wherein, to support the sending of data from the host toward the controller of the storage element using the one of the multiple queues, the instructions, when executed by the at least one processor, cause the apparatus to:

send, by the host toward the controller of the storage element using the transport layer connection, a protocol data unit including a command identifier configured to indicate that the protocol data unit is associated with a write command, the respective queue identifier associated with the one of the multiple queues, and the data.

17. The apparatus of claim 1, wherein, to support the communications between the host and the controller of the storage element for the multiple queues on the host, the instructions, when executed by the at least one processor, cause the apparatus to:

support, based on the transport layer connection, receiving of data by the host from the controller of the storage element using one of the multiple queues.

18. The apparatus of claim 17, wherein, to support the sending of data from the host toward the controller of the storage element using the one of the multiple queues, the instructions, when executed by the at least one processor, cause the apparatus to:

receive, by the host from the controller of the storage element using the transport layer connection, a protocol data unit including a command identifier configured to indicate that the protocol data unit is associated with a read command, the respective queue identifier associated with the one of the multiple queues, and the data.

19. The apparatus of claim 1, wherein the communications between the host and the controller of the storage element for the multiple queues on the host are supported by a set of multiple transport layer subflows of the transport layer connection.

20. The apparatus of claim 1, wherein the communications between the host and the controller of the storage element for the multiple queues on the host are based on a storage access and transport protocol.

21. The apparatus of claim 20, wherein the storage access and transport protocol includes a Multi-Queue Non-Volatile Memory Express (MQ-NVMe) protocol.

22. The apparatus of claim 1, wherein the transport layer connection includes a Transmission Control Protocol (TCP) connection, a Multipath - TCP (MP-TCP) connection, a Stream Control Transmission Protocol (SCTP) connection, or a QUIC connection.

23. A method, comprising:

supporting, by a host based on a transport layer connection with a controller of a storage element, communications between the host and the controller of the storage element for multiple queues on the host, wherein each queue of the multiple queues includes a respective send queue configured to support sending of communications toward a respective receive queue on the controller of the storage element and a respective receive queue configured to support receiving of communications from a respective send queue on the controller of the storage element, wherein each queue of the multiple queues has a respective queue identifier associated therewith; and supporting communications between the host and the controller of the storage element for the multiple queues on the host based on the respective queue identifiers associated with the respective multiple queues.

24. An apparatus, comprising:

at least one processor; and at least one memory including instructions which, when executed by the at least one processor, cause the apparatus to:

support establishment of a transport layer connection between a host and a controller of a storage element;

support establishment of a storage access and transport protocol connection between the host and the controller of the storage element based on the transport layer connection;

support, based on an indication that the storage access and transport protocol connection is configured to support communications for multiple queues based on the transport layer connection, establishment of the multiple queues for the storage access and transport protocol connection, wherein each queue of the multiple queues includes a respective send queue and a respective receive queue, wherein each queue of the multiple queues has a respective queue identifier associated therewith; and support, based on the respective queue identifiers associated with the respective multiple queues, communication between the host and the controller of the storage element.

* * * * *